(12) United States Patent
Zguris et al.

(10) Patent No.: US 6,495,286 B2
(45) Date of Patent: Dec. 17, 2002

(54) GLASS FIBER SEPARATORS FOR LEAD-ACID BATTERIES

(75) Inventors: George C. Zguris, Canterbury, NH (US); Frank C. Harmon, Jr., Ayer, MA (US)

(73) Assignee: Hollingsworth & Vose Company, East Walpole, MA (US)

( * ) Notice: Subject to any disclaimer, the term of this patent is extended or adjusted under 35 U.S.C. 154(b) by 0 days.

(21) Appl. No.: 09/973,482

(22) Filed: Oct. 9, 2001

(65) Prior Publication Data

US 2002/0142226 A1 Oct. 3, 2002

Related U.S. Application Data

(63) Continuation of application No. 09/214,332, filed as application No. PCT/US97/11579 on Jun. 30, 1997, now abandoned.
(60) Provisional application No. 60/021,154, filed on Jul. 1, 1996.

(51) Int. Cl.$^7$ ........................... H01M 10/06; H01M 2/16
(52) U.S. Cl. ........................ 429/204; 429/142; 429/252
(58) Field of Search .............................. 429/252, 142, 429/204

(56) References Cited

U.S. PATENT DOCUMENTS

| | | | |
|---|---|---|---|
| 2,477,000 A | 7/1949 | Osborne | |
| 2,734,095 A | 2/1956 | Mears et al. | |
| 4,205,122 A | 5/1980 | Minra et al. | |
| 4,216,280 A | 8/1980 | Kono et al. | |
| 4,216,281 A | 8/1980 | O'Rell et al. | |
| 4,245,013 A | 1/1981 | Clegg et al. | |
| 4,359,511 A | 11/1982 | Strzempko | |
| 4,363,856 A | 12/1982 | Waterhouse | |
| 4,367,271 A | 1/1983 | Hasegawa et al. | |
| 4,373,015 A | 2/1983 | Peters et al. | |
| 4,387,144 A | 6/1983 | McCallom et al. | |
| 4,465,748 A | 8/1984 | Harris | |
| 4,529,677 A | 7/1985 | Bodendorf | |
| 4,908,282 A | 3/1990 | Badger | |
| 5,091,275 A | 2/1992 | Brecht et al. | |
| 6,071,641 A | * 6/2000 | Zguris | 429/144 |

FOREIGN PATENT DOCUMENTS

| | | |
|---|---|---|
| JP | 55/146872 | 11/1980 |
| JP | 59-073842 A | 4/1984 |
| JP | 63-224144 A | 9/1988 |
| JP | 64-52375 A | 2/1989 |
| JP | 4-22061 A | 1/1992 |

* cited by examiner

Primary Examiner—John S. Maples
(74) Attorney, Agent, or Firm—John C. Purdue; David C. Purdue

(57) ABSTRACT

A glass fiber separator material is disclosed. The separator is composed of a mass of intermeshed glass fibers substantially all of which have a fiber diameter not greater than about 20 $\mu$m, and at least 5 percent w/w of which have a fiber diameter less than 1 $\mu$m, and, distributed through the glass fibers, and from 0.2 percent w/w to 20 percent w/w of cellulose fibrils. The fibrils are from a slurry having a Canadian freeness sufficiently low that the separator material has a tensile strength greater than an otherwise identical separator where glass fibers having an average diameter greater than 1 $\mu$m replace the cellulose fibrils.

8 Claims, 18 Drawing Sheets

GLASS FIBER SEPARATORS FOR LEAD-ACID BATTERIES

REFERENCE TO RELATED APPLICATIONS

This is a continuation of application Ser. No. 09/214,332, filed Apr. 7, 1999 as a 35 USC 371 application based upon PCT/US97/11579, filed Jun. 30, 1997 and as a continuation in part of Provisional application Serial No. 60/021,154, filed Jul. 1, 1996.

BACKGROUND OF THE INVENTION

1. Field of the Invention

The present invention relates generally to the field of batteries and, more specifically, to separators containing glass fibers which are positioned between the positive and negative plates of batteries and to a method for producing such separators. As is subsequently discussed in more detail, separators containing glass fibers are well known. Long before glass fiber separators, however, cedar veneers were used as a separator material, and were replaced by microporous, hard rubbery separators and cellulose separators impregnated with resins.

2. Description of the Prior Art

Valve regulated ("sealed"—"recombinant") lead acid (VRLA) batteries are known; they usually comprise a plurality of positive and negative plates, as in a prismatic cell, or layers of separator and positive and negative electrodes wound together, as in a "jelly roll" cell. The plates are arranged so that they alternate, negative-positive-negative, etc., with separator material and paste separating each plate from adjacent plates. The separator, which, typically, is a mat of glass fibers, is an inert material; it stores battery acid, applies a force to paste-grid interfaces, and provides low electric resistance. In addition, in VRLA batteries, there are innumerable gas channels in the separator material through which oxygen can migrate from the positive electrode, when generated there, to the negative electrode where it can be recombined with hydrogen, according to the oxygen cycle. One of the most important functions of a separator in a VRLA battery is to force the paste into contact with the plates, and cause a pressure between the plates.

Glass fiber separator material, typically, is produced commercially on paper making equipment including fourdrinier machines and rotoformers, inclined fourdrinier machines and extended wire rotoformers. In the production of separator made of glass fibers for VRLA batteries, it is preferred that no organic material be added to a furnish from which separator sheets are made; the entanglement of individual fibers serves to maintain the sheet in a cohesive structure, and water glass, which sometimes forms on the fiber surfaces, serves as a binder. Organic binders, however, tend to decrease the ability of a separator to wick acid, and to decrease the amount of acid a separator can hold. A great deal of work has been directed to modifying the glass fiber furnish from which separators are produced to improve battery performance and/or lower the cost of the separator. Some of the work has entailed the addition of synthetic fibers for various reasons, such as the use of thermoformable plastic fibers so that the separator can be heat sealed on its edges to envelop a plate. Other work, which pertains to the field of this invention, has been directed to the use of filler, e.g., silica, to provide separators which are comparable to all glass fiber separators, at a lower cost. Separators made from glass fibers to which cellulose has been added and polyolefin fibers to which cellulose has been added have also been suggested. Prior art patents are discussed below.

U.S. Pat. No. 4,465,748 (Harris) discloses glass fiber sheet material for use as a separator in an electrochemical cell, and made from 5 to 35 percent w/w of glass fibers less than 1 $\mu$m in diameter; the patent also discloses a glass fiber sheet for such use wherein there are fibers of a continuous range of fiber diameters and lengths, and most of the fibers are not over 5 mm in length.

U.S. Pat. No. 4,216,280. (Kono et al.), discloses glass fiber sheet material for use as a plate separator in a battery, and made from 50 to 95 percent w/w of glass fibers less than 1 $\mu$m in diameter and 50 to 5 percent w/w of coarser glass fibers. The coarser glass fibers, the reference says, have a fiber diameter larger than 5 $\mu$m, preferably larger than 10 $\mu$m, and it is advantageous for some of the coarser fibers to have diameters of 10 $\mu$m to 30 $\mu$m.

U.S. Pat. No. 4,205,122 (Minra et al) discloses a battery separator of reduced electric resistance comprising a self supporting, non woven mat consisting essentially of a mixture of olefinic resin fibers having a coarseness of from 4 to 13 decigrex and olefinic resin fibers having a coarseness of less than 4 decigrex, the latter fibers being present in an amount of not less than 3 parts by weight per 100 parts by weight of fibers; up to about 600 parts by weight of inert filler materials per 100 parts by of fibers can also be used. The battery separator is produced by subjecting a suitable aqueous dispersion to a sheet-forming operation, drying the resulting wet, non-woven mat, and heat treating the dried mat at a temperature ranging from a point 20° lower than the melting point of the aforementioned fibers to a point about 50° higher than the melting point.

U.S. Pat. No. 4,216,281 (O'Rell et al.) discloses a separator material produced from a furnish containing 30 to 70 percent w/w of polyolefin synthetic pulp, 15 to 65 percent w/w of a siliceous filler and 1 to 35 percent w/w of "long" fibers which can be polyester fibers, glass fibers, or a mixture of the two. Cellulose in an amount up to about 10 percent w/w is disclosed as an optional ingredient of the furnish.

U.S. Pat. No. 4,363,856 (Waterhouse) discloses a separator material made from a furnish composed of polyolefin pulp fibers and glass fibers, and names polyester staple fibers, polyolefin staple fibers and cellulose pulp fibers as alternative constituents of the furnish.

U.S. Pat. No. 4,387,144 (McCallum) discloses a battery separator having a low electrical resistance after extended use which is made by thermal consolidation and thermal embossing of a paper web formed from a furnish containing a synthetic pulp the fibrils of which are filled with an inorganic filler, the web incorporating a wetting agent which is preferably an organic sulphonate, and organic succinate, or phenol ethoxylate.

U.S. Pat. No. 4,373,015 (Peters et al.), discloses sheet material for use as a separator in a battery, and "comprising organic polymeric fibers"; both of the examples of the reference describe the sheet material as "short staple fiber polyester matting about 0.3 mm thick", and indicate that the polyester fibers range from about 1 $\mu$m to about 6 $\mu$m in diameter.

Sheet separators for use in conventional (not valve regulated) batteries and comprising both glass fibers and organic fibers are disclosed in all of the following U.S. Pat. No. 4,529,677 (Bodendorf); U.S. Pat. No. 4,363,856 (Waterhouse); and U.S. Pat. No. 4,359,511 (Strzempko).

U.S. Pat. No. 4,367,271, Hasegawa, discloses storage battery separators composed of acrylic fibrils in an amount of up to about 10 percent w/w, balance glass fibers.

Japanese patent document 55/146,872 discloses a separator material comprising glass fibers (50–85 percent w/w) and organic fibers (50–15 percent w/w).

U.S. Pat. No. 4,245,013, Clegg et al., discloses a separator made by overlaying a first sheet of fibrous material including polyethylene fibers with a second sheet of fibrous material including polyethylene and having a synthetic pulp content higher than the first sheet.

U.S. Pat. No. 4,908,282, Badger, discloses a separator comprising a sheet made from first fibers which impart to the sheet an absorbency greater than 90% and second fibers which impart to the sheet an absorbency less than 80% wherein the first and second fibers are present in such proportions that the sheet has an absorbency of from 75 to 95%. This patent discloses that fine glass fibers have a high absorbency, that coarse glass fibers have a low absorbency, and that hydrophobic organic fibers have an extremely low absorbency, and that, when this separator is saturated with electrolyte, unfilled voids remain so that gas can transfer from plate to plate for recombination. The disclosure of Badger is incorporated herein by reference.

U.S. Pat. No. 5,091,275 (Brecht et al.) discloses a glass fiber separator which expands when exposed to electrolyte. The separator comprises glass fibers which are impregnated with an aqueous solution of colloidal silica particles and a sulfate salt. The separator is produced by forming a paper making web of glass fibers, impregnating the web with the aqueous mixture of silica and the salt, lightly compressing the impregnated web to remove some of the aqueous solution, partially drying the web, compressing the web to a final thickness and completing the drying of the web. The web is preferably compressed to a thickness which is less than the distance between plates in a given cell, so that insertion of an assembled cell stack into a case is facilitated. When electrolyte is added to the case, the salt dissolves in the electrolyte and the separator expands to provide good contact between the plates and the separators. According to the patent, the silica contributes to the recombination performance of cells incorporating the pre-compressed separator. The silica also contributes a great deal of stiffness to the separator, so much so that the separator may be characterized as rigid.

It has been determined that the production of battery separator by paper-making techniques from a furnish of glass fibers and silica powder leads to problems which are caused by variations in the concentration of the silica powder in the furnish. Typical glass fiber furnishes have a liquid content exceeding 98 percent w/w. In the course of making separator sheets, most of the water is removed from the furnish in the first few feet of a screen on which the furnish is cast. The water, known as white water, is recycled and winds up back in the headbox of the machine. If the furnish is composed exclusively of glass fibers, virtually none of the fibers pass through the wire and wind up in the white water. However, furnishes comprising glass fibers and silica powder do not fare so well. In the absence of a retention aid, significant amounts of silica powder from such furnishes do pass through the paper making wire and wind up in the white water. Left unchecked, this phenomenon causes the concentration of silica powder in the furnish to increase, undesirably changing the properties of the furnish. Heretofore, the problem of silica powder and the like passing through a paper making wire has been avoided through the use of binders as retention aids.

U.S. Pat. No. 2,477,000 discloses a synthetic fiber paper produced from fibrillae and fibers made by methods wherein a solution of the fiber is extruded through very small orifices (spinnerets) and then the extruded solution is allowed to congeal either in a precipitating bath or by evaporation of the solvent or by temperature changes (see column 2, lines 25 and following). The patent says that fibers of cellulose acetate, cellulose nitrate, regenerated cellulose from viscose, "Vinylite (a synthetic resin made by polymerization of vinyl compounds), Aralac (a fibrous product made from skim milk casein), and spun glass" which range in length from __ inch to 1 inch and in diameter from 12–80 microns and fibrillae preferably derived from flax, Manila hemp, caroa or hemp can be used to make the paper. At least 90 percent of the fibrillae should be from 0.0015 to 0.0025 inch in length and from 0.0000027 to 0.0000044 inch in width.

BRIEF DESCRIPTION OF THE INSTANT INVENTION

The instant invention is based upon the discovery that comparatively small additions of wood pulp, if beaten or refined to a sufficient degree to produce a highly fibrillated cellulose fiber, to a glass fiber furnish suitable for use in making battery separator material, (1) cause surprisingly high increases in some of the strength properties of separator made from the furnish, (2) improve the cut through resistance of a separator made from the furnish, (3) and have a unique characteristic in that they hold a greater proportion of acid introduced thereunto when the separator is subsequently compressed.

In addition, the separator is repulpable, in the sense that it can be used as a constituent of a glass fiber which is used to produce "new" separator: furthermore, batteries made from glass fiber separator material which contains comparatively small amounts of wood pulp which has been beaten or refined to a sufficient degree, have remarkably long service lives, as indicated by their performance in cycling tests. In general, the pulp slurry should be beaten or refined to a Canadian freeness not greater than about 650 cc, or to an equivalent freeness by other measurement techniques, and a remarkable increase in tensile strength is achieved when the pulp is beaten or refined to a Canadian freeness not greater than about 120 cc, or to an equivalent freeness by other measurement techniques.

Definitions

Figure 1:
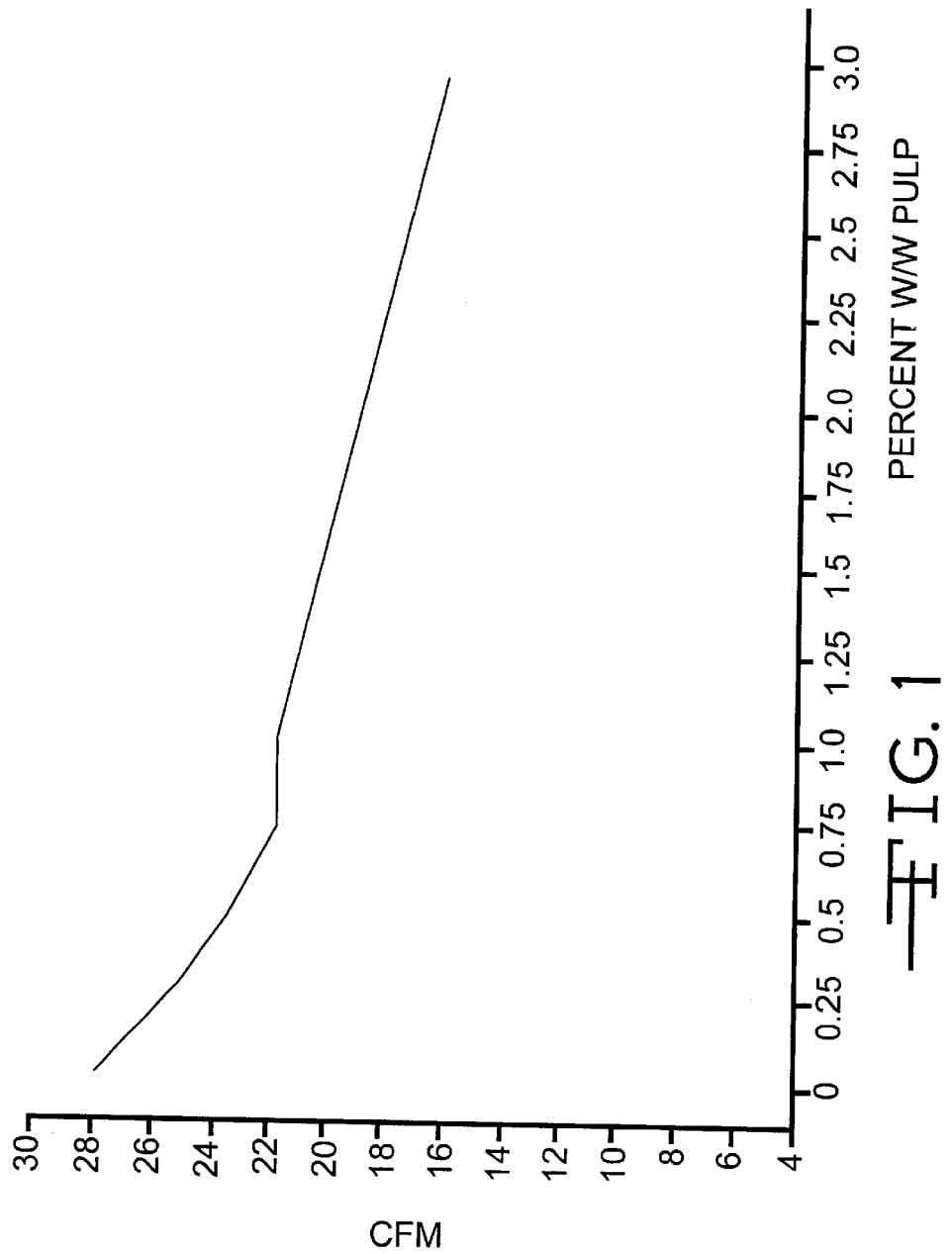
FIG. 1 is a plot of the percent w/w of added cellulose in glass fiber separator material according to the invention vs. the liters per second of air flowing through the separator material under test conditions that are subsequently described herein.

Subsequently herein, the term "percent v/v" means percent by volume; the term "percent w/w" and the symbol % mean percent by weight; the term "wire", as applied to a paper making machine, means the surface of the machine on which a furnish is cast in producing paper, and can be, for example, the screen of a Fourdrinier machine or the vacuum drum of a rotoformer machine; pore sizes reported herein, unless otherwise indicated, are in microns, and are determined by the first bubble method or by liquid porosimetry, Coulter; all temperatures are in ° C.: and the following abbreviations have the meanings indicated: $\mu$m=micron or microns; mg=milligram or milligrams; g=gram or grams; kg=kilogram or kilograms; l=liter or liters: ml=milliliter or milliliters; cc=cubic centimeter or cubic centimeters; pcf=pound per cubic foot or pounds per cubic foot; m=meter or meters; cm=centimeter or centimeters: mm=millimeter or millimeters; m=meter or meters: mil=inch$\times 10^{-3}$ or inches$\times 10^{-2}$ (multiply times 25.4 to convert to mm); KPa=pressure in thousands of Newtons per square meter; psi=pounds per square inch (multiply times 6.89 to convert to KPa); and KN=force in thousands of Newtons.

EXAMPLE 1

Glass fiber separator hand sheets were produced in a laboratory apparatus by depositing a furnish on a wire or screen, and draining the furnish. The apparatus comprised a tank with a screen in the bottom, a drain below the screen, a valve which opened and closed the drain, and a hand paddle which was moved back and forth to simulate the movement of a furnish in commercial papermaking apparatus and establish a "machine direction" parallel to the direction of paddle movement. The furnish was produced by charging to the tank acidified water, pH 2.7, and solids composed of 74.5 percent w/w Schuller 206 glass fibers, average fiber diameter 0.76 $\mu$m, 12.8 percent w/w Evanite 610 glass fibers, nominal fiber diameter 2.6 $\mu$m, and 12.8 percent w/w A20-BC-½ inch glass fibers, nominal fiber diameter 13 $\mu$m, stirring for about a minute, charging to the tank a kraft pulp slurry which had a Canadian freeness of 57 cc and a consistency of 1.235 percent, and stirring for an additional 2 minutes. The composition in the mixer, after the pulp addition, contained 73 percent w/w Schuller 206 glass fibers, 12.5 percent w/w Evanite 610 glass fibers, 12.5 percent w/w A20-BC-½ inch glass fibers and 2 percent w/w pulp fibrils. The furnish and the pulp were stirred for about two minutes, after which the valve was opened so that the water drained through the screen while the separator was retained on the screen. The furnish contained enough glass fibers to produce a separator having a grammage of 30 g/m² at a thickness of 0.15 mm. The separator hand sheet was heated in a drying oven to about 150° for 30 minutes. Two separator sheets produced as described above were tested and various data, summarized below, were collected (the data are averages of the determinations on the two sheets). Frazier permeability, in the following data and elsewhere herein, is in L/sec/m² @20 mm H$_2$O. The tests, instruments and apparatus used to determine various properties in Example 1 and elsewhere herein are described in a publication entitled *BCI/RBSM Standard Test Methods*, Battery Council International (the disclosure of this publication is incorporated herein by reference).

| | |
|---|---|
| Grammage (g/m²) | 36.7 |
| Thickness, mm (under a load of 10.34 KPa): | 0.15 |
| Tensile, MD (Newtons/m): | 363 |
| Tensile, CD (Newtons/m): | 275 |
| Elongation, MD (percent of total): | 1.3 |
| Elongation, CD (percent of total): | 1.4 |
| Pore Size-first bubble method, $\mu$m | 30 |
| Frazier Permeability | 98 |
| Pore size-liquid porosimetry, Coulter, $\mu$m | |
| minimum | 5.1 |
| maximum | 18.5 |
| mean | 5.5 |

"Frazier Permeability" values reported herein were determined using Frazier Permeability tester 91A (TAPPTT2510M-85).

"Wicking", as reported above and subsequently herein, was determined by the procedure described in U.S. Pat. No. 5,225,298, column 7, lines 20 and following, using water instead of sulfuric acid as there described: the test is known as the Japanese Industrial Standard method.

The composition of the Schuller 206 glass fibers used in Example 1 and in subsequent Examples vary slightly from time to time. Mean values, in percent w/w, calculated from data furnished by Schuller for the period when the examples were carried out are given below:

| | | | |
|---|---|---|---|
| SiO$_2$ | 65.40 | Na$_2$O | 16.11 |
| Al$_2$O$_3$ | 2.99 | K$_2$O | 0.69 |
| CaO | 5.88 | B$_2$O$_3$ | 5.31 |
| MgO | 2.79 | F$_2$ | 1.02 |

Schuller also indicates that the glass contains Fe$_2$O$_3$, TiO$_2$, ZrO$_2$, Cr$_2$O$_3$, SrO, BaO, MnO, ZnO, Li$_2$O, SO$_3$ and Pb in amounts less than 10%.

The nominal composition of the Evanite 610 glass fibers used in Example 1 and in subsequent Examples varies, in percent w/w, within the following ranges:

| | |
|---|---|
| SiO$_2$ | 60.0–69.0 |
| Al$_2$O$_3$ | 3.0–6.0 |
| CaO | 5.0–7.0 |
| MgO | 2.5–4.5 |
| Na$_2$O | 8.0–12.0 |
| K$_2$O | 0.5–3.0 |
| B$_2$O$_3$ | <0.02 |

-continued

| | |
|---|---|
| F$_2$ | 0.0–1.0 |
| ZnO | <0.04 |
| Fe$_2$O$_3$ | <0.02 |

The A20-BC-½ inch glass fibers used in the procedure described above and in other procedures described herein are commercially available from Schuller under the indicated designation.

Glass fiber separator sheets according to the invention were produced on a pilot plant paper making machine by depositing at furnish on an advancing wire, through which water from the furnish drained. The furnish was produced in a mixer from acidified water, pH 2.7, and solids composed of Schuller 206 glass fibers, Schuller 210X glass fibers, nominal fiber diameter 3.0 μm and the same composition as the 206 fibers, and A20-BC-½ inch glass fibers. The furnish was stirred in the mixer for about one minute, after which time a kraft pulp slurry which had a Canadian freeness of 57 cc and a consistency of 1.235 percent was added to the furnish in the mixer. The composition in the mixer, after the pulp addition, contained about 7 parts by weight of Schuller 206 glass fibers, about 1 part by weight of each of Schuller 210 glass fibers, A20-BC-½ inch glass fibers, and about 0.6 part by weight of pulp fibrils. The furnish and the pulp were stirred for about two minutes, after which time the pulp-containing furnish was charged to the headbox of the pilot plant machine. An addition of 0.6 part by weight of pulp fibrils from red wood pulp that had been beaten to a Canadian freeness less than 100 cc was then made to the material in the headbox, and the furnish which resulted was flowed onto the advancing wire to produce a separator having a grammage of 30 g/m$^2$ at a thickness of 0.15 mm. The separator was ultimately heated in a drying oven to about 150° for 30 minutes. The separator had a loss on ignition a little over 12 percent w/w, indicating a total pulp content of about 12 percent w/w. The procedure described in this paragraph constitutes the best mode presently contemplated by to the inventors with respect to the production of battery separator material according to the invention.

Cells according to the invention were made using the separator material produced in the pilot plant paper machine as described above, and were subjected to life testing in comparison with batteries made using conventional, all glass separators, but otherwise identical. Battery capacity after each cycle, as a percentage of initial capacity, is set forth in Table I, below (the control battery test was terminated after 7 cycles):

TABLE I

| | Capacity, percent of initial | |
|---|---|---|
| Number of cycles | According to invention | Control |
| 1 | 113.5 | 103.6 |
| 2 | 115.6 | 93.6 |
| 3 | 111.9 | 76.0 |
| 4 | 109.3 | 53.4 |
| 5 | 107.4 | 34.0 |
| 6 | 105.3 | 25.1 |
| 7 | 103.6 | 20.9 |
| 8 | 101.7 | *** |
| 9 | 100.0 | *** |
| 10 | 98.6 | *** |
| 11 | 97.2 | *** |

TABLE I-continued

| | Capacity, percent of initial | |
|---|---|---|
| Number of cycles | According to invention | Control |
| 12 | 95.5 | *** |
| 13 | 93.7 | *** |
| 14 | 90.1 | *** |
| 15 | 87.6 | *** |
| 16 | 86.1 | *** |
| 17 | 80.0 | *** |
| 18 | 74.9 | *** |
| 19 | 74.0 | *** |
| 20 | 67.3 | *** |

Figure 3:
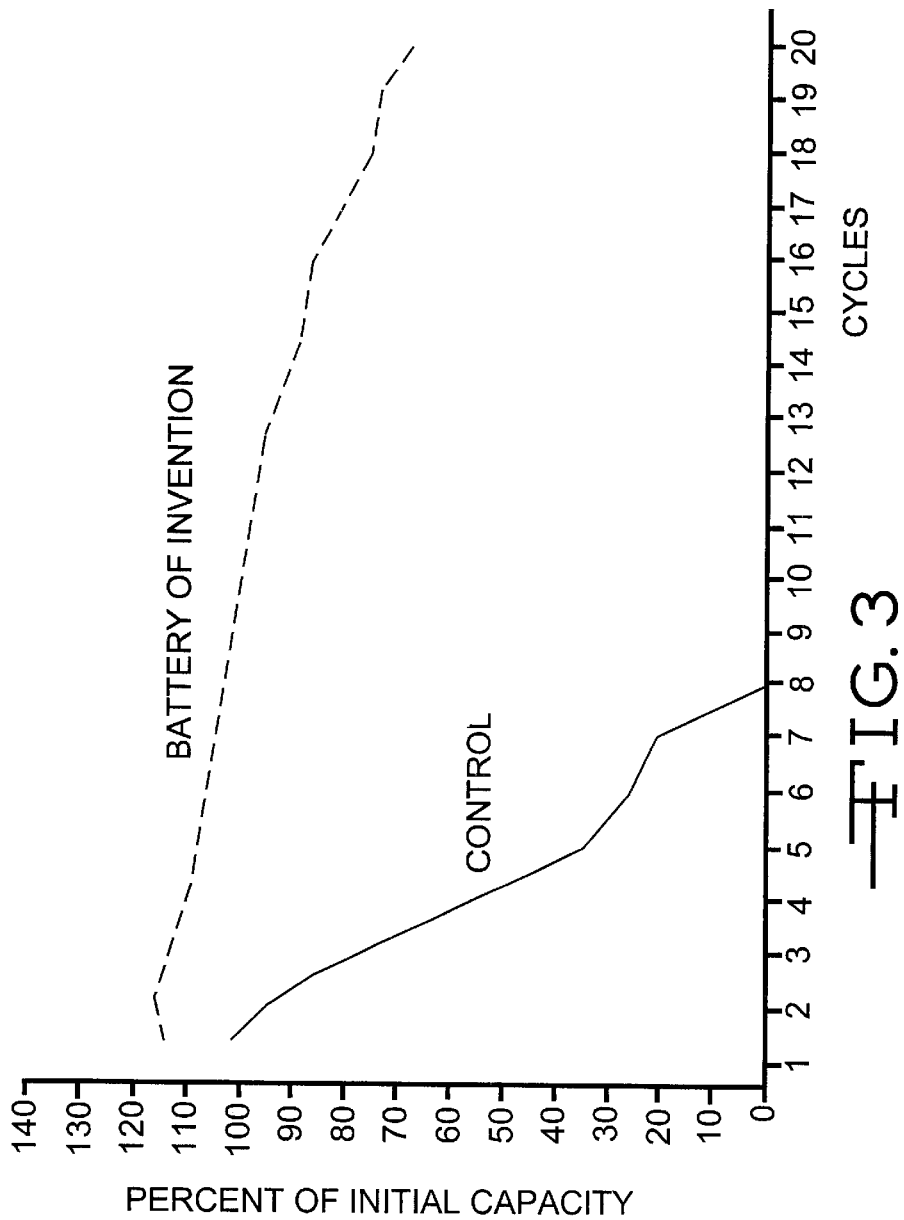
FIG. 3 is a plot of percent of initial capacity vs. number of test cycles for a battery according to the invention and for a control battery.
Figure 4:
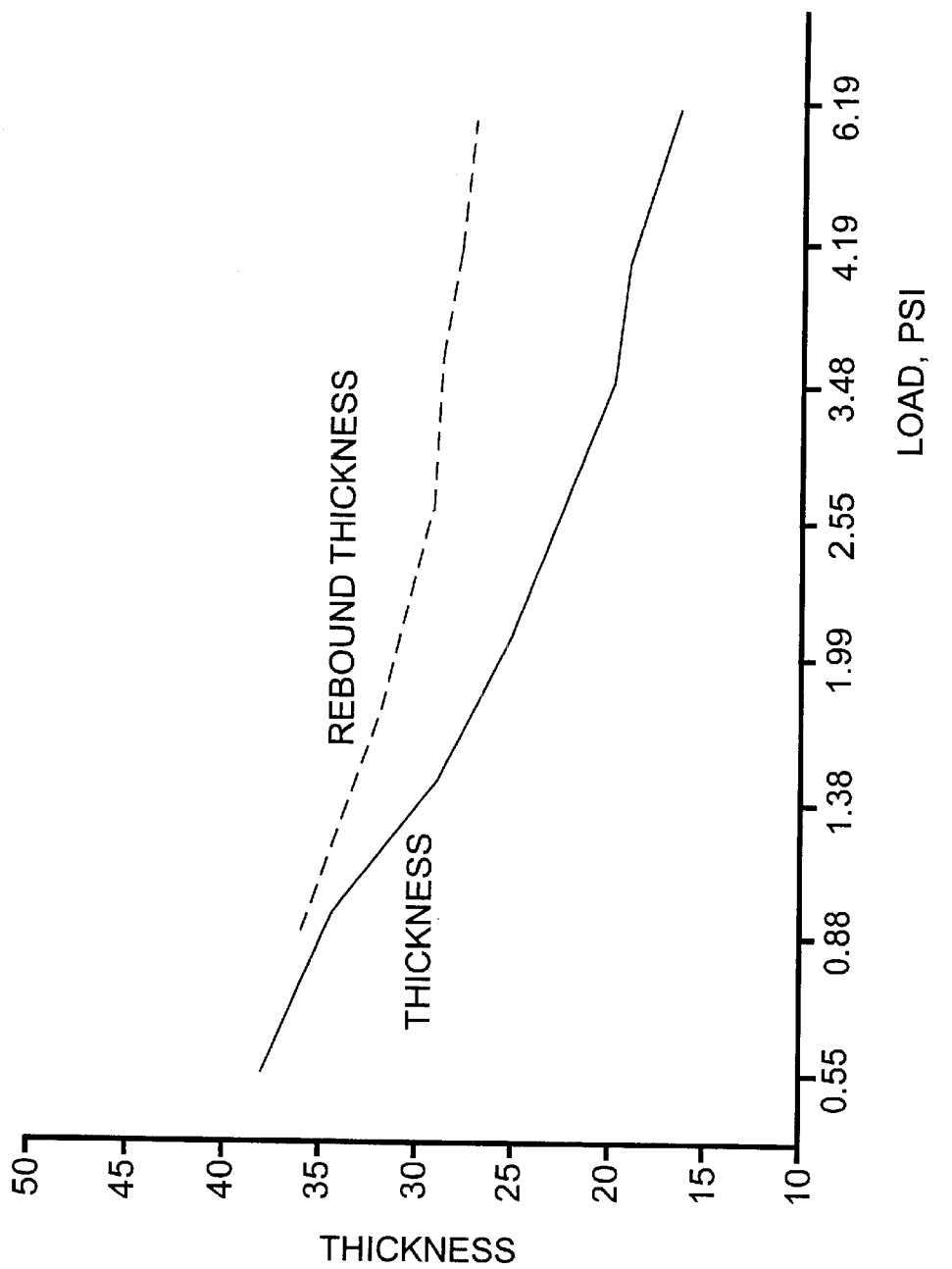
FIGS. 4 through 9 are plots of thickness (the values plotted are 1000 times the thickness of the separator in mm) vs. load and rebound thickness vs. load for five glass fiber separator materials according to the invention and a control, where rebound thickness is 1000 times the thickness of a separator material in mm after that separator has been subjected to a load and the load has been reduced to 0.55 pounds per square inch (3.79 KPa); the data in FIGS. 4 through 9 are for dry separator material.
Figure 5:
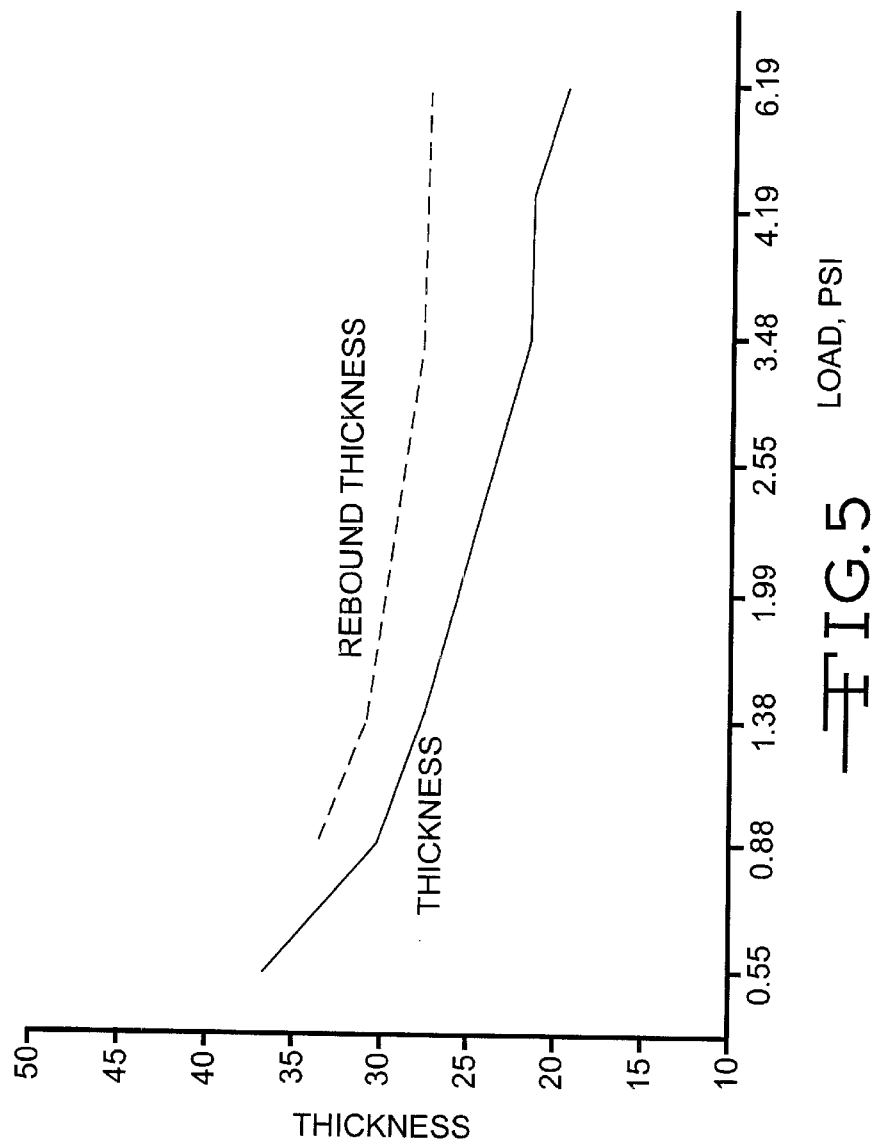
Figure 6:
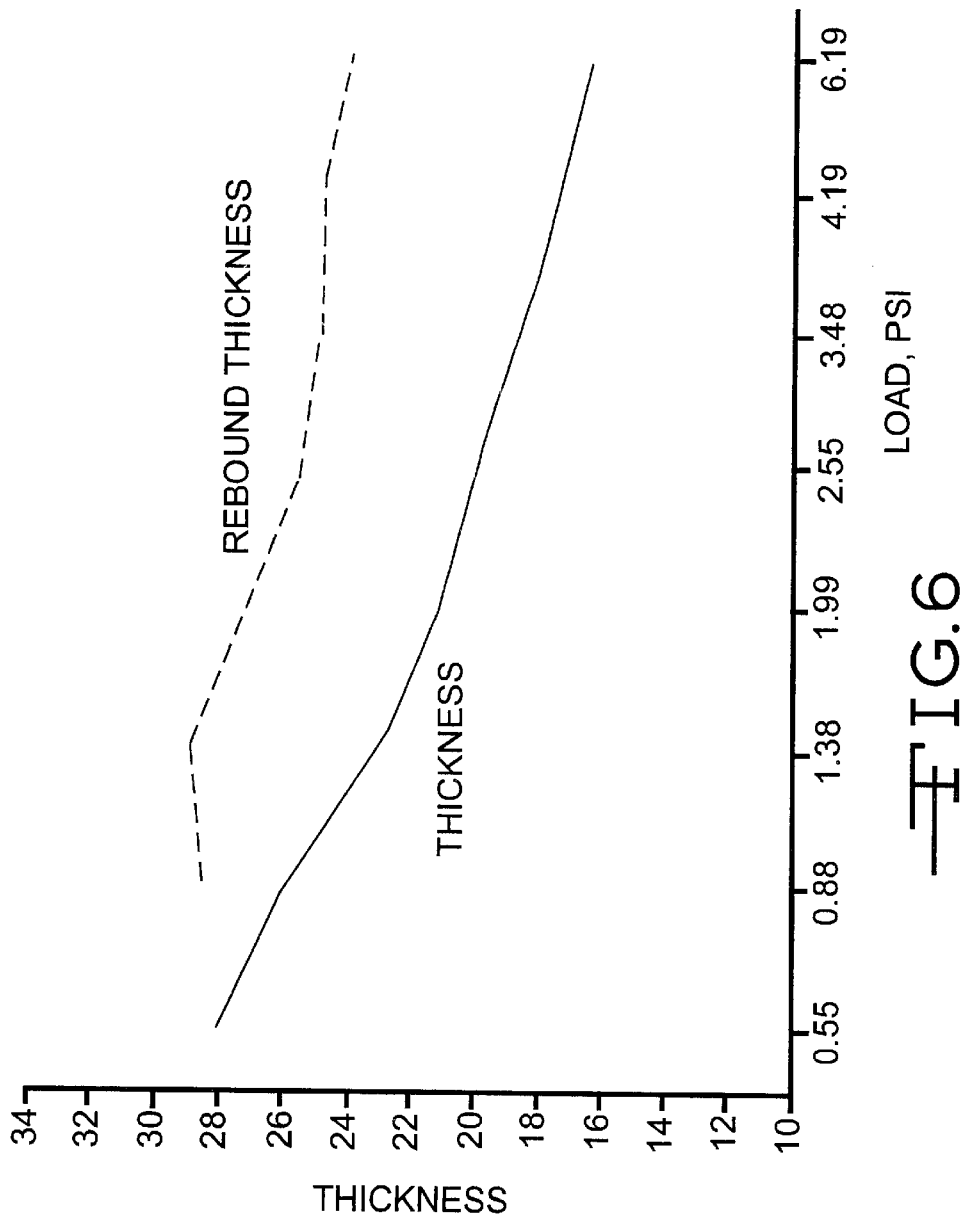
Figure 7:
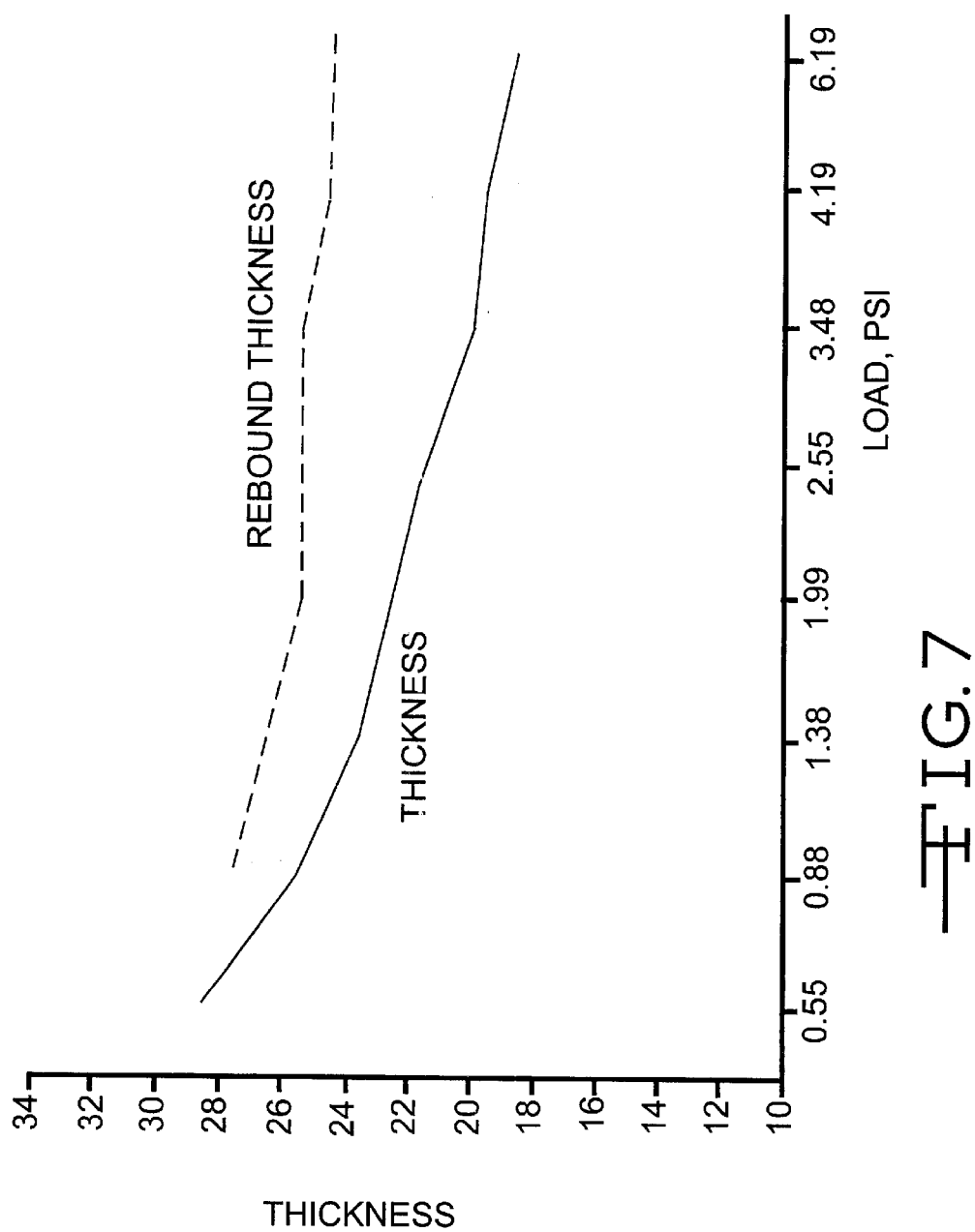
Figure 8:
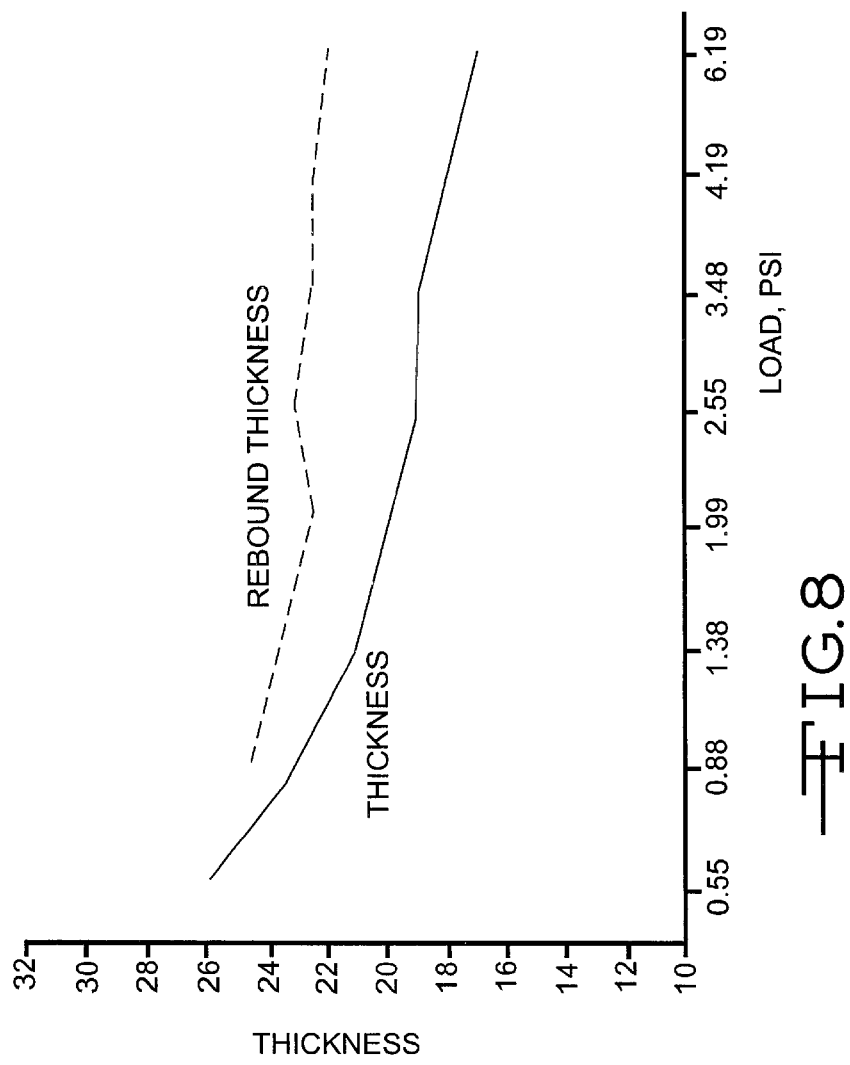
Figure 9:
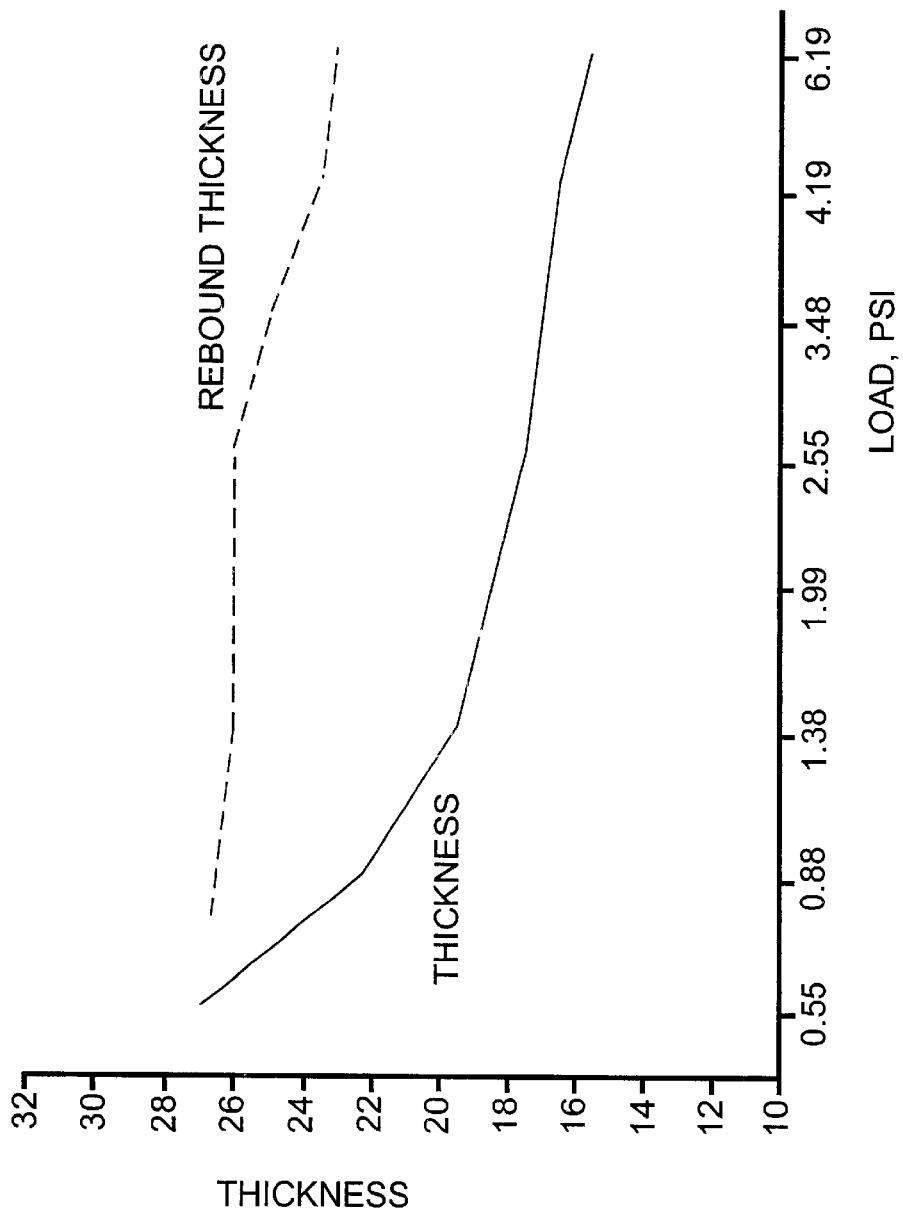
Figure 10:
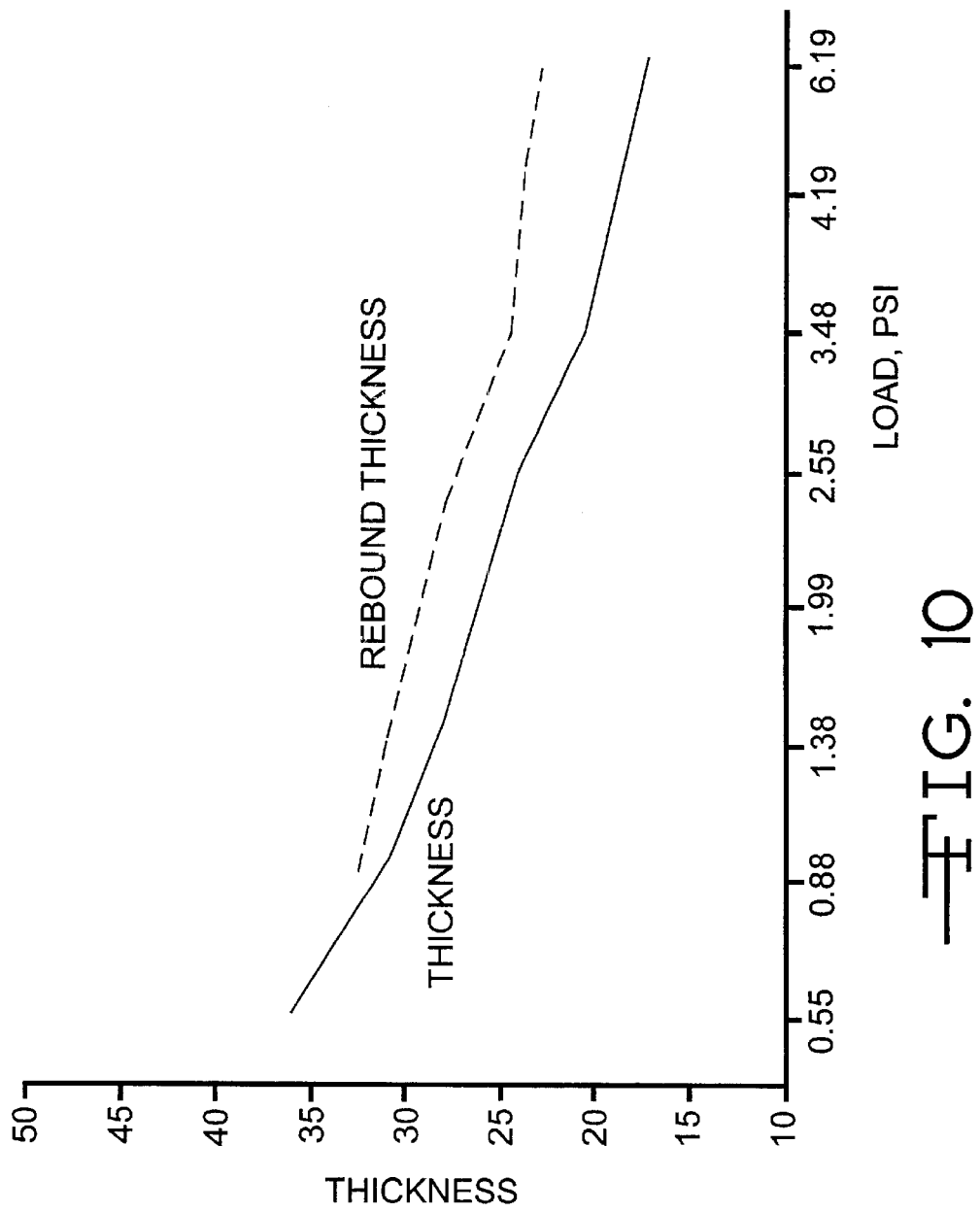
FIGS. 10 through 15 are plots similar to those of FIGS. 4 through 9, showing thickness vs. load and rebound thickness vs. load for the five glass fiber separator materials according to the invention and for the control, but are based on data where, before testing, each of the separator materials had been wet with seven times its weight of sulfuric acid having a specific gravity of 1.286.
Figure 11:
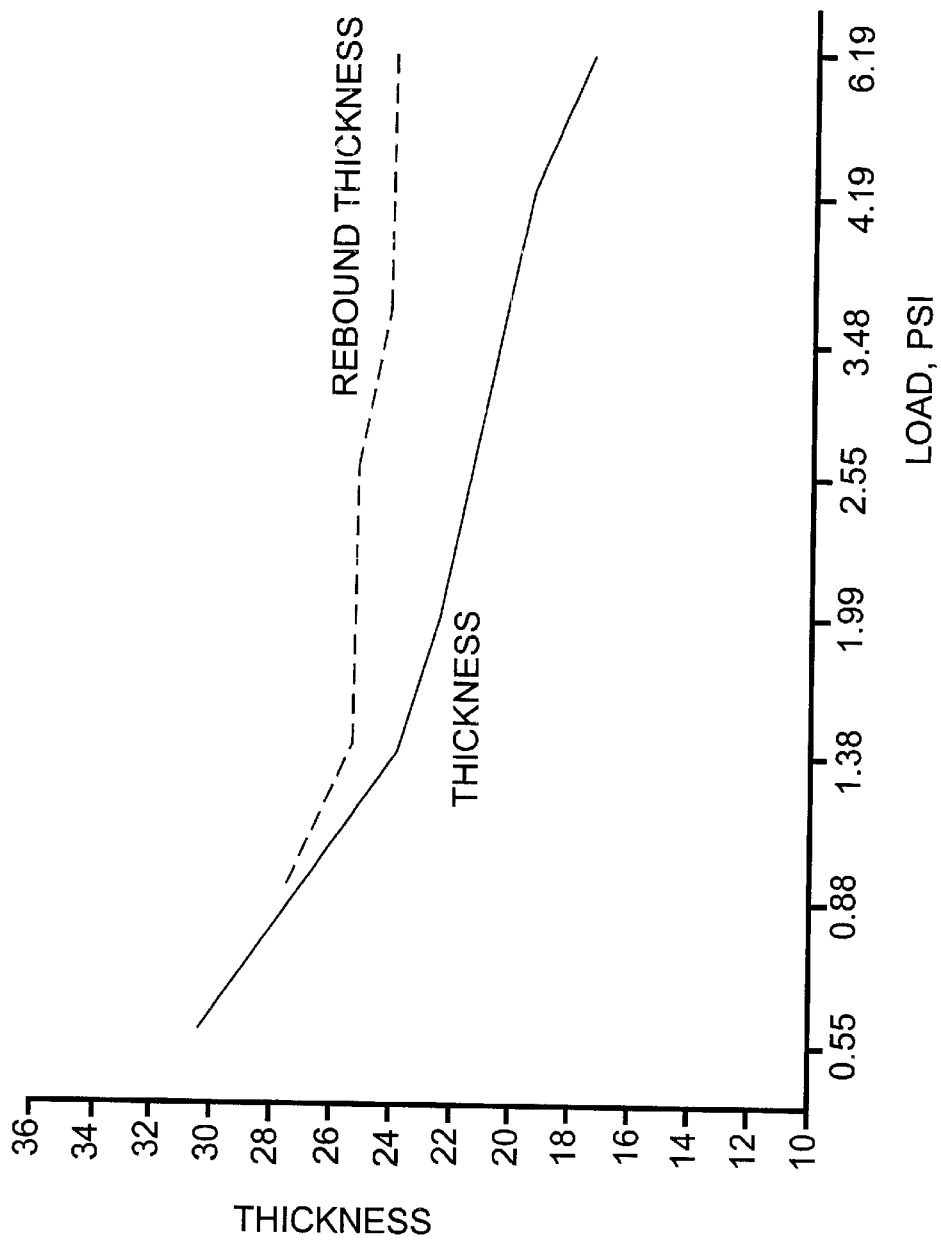
Figure 12:
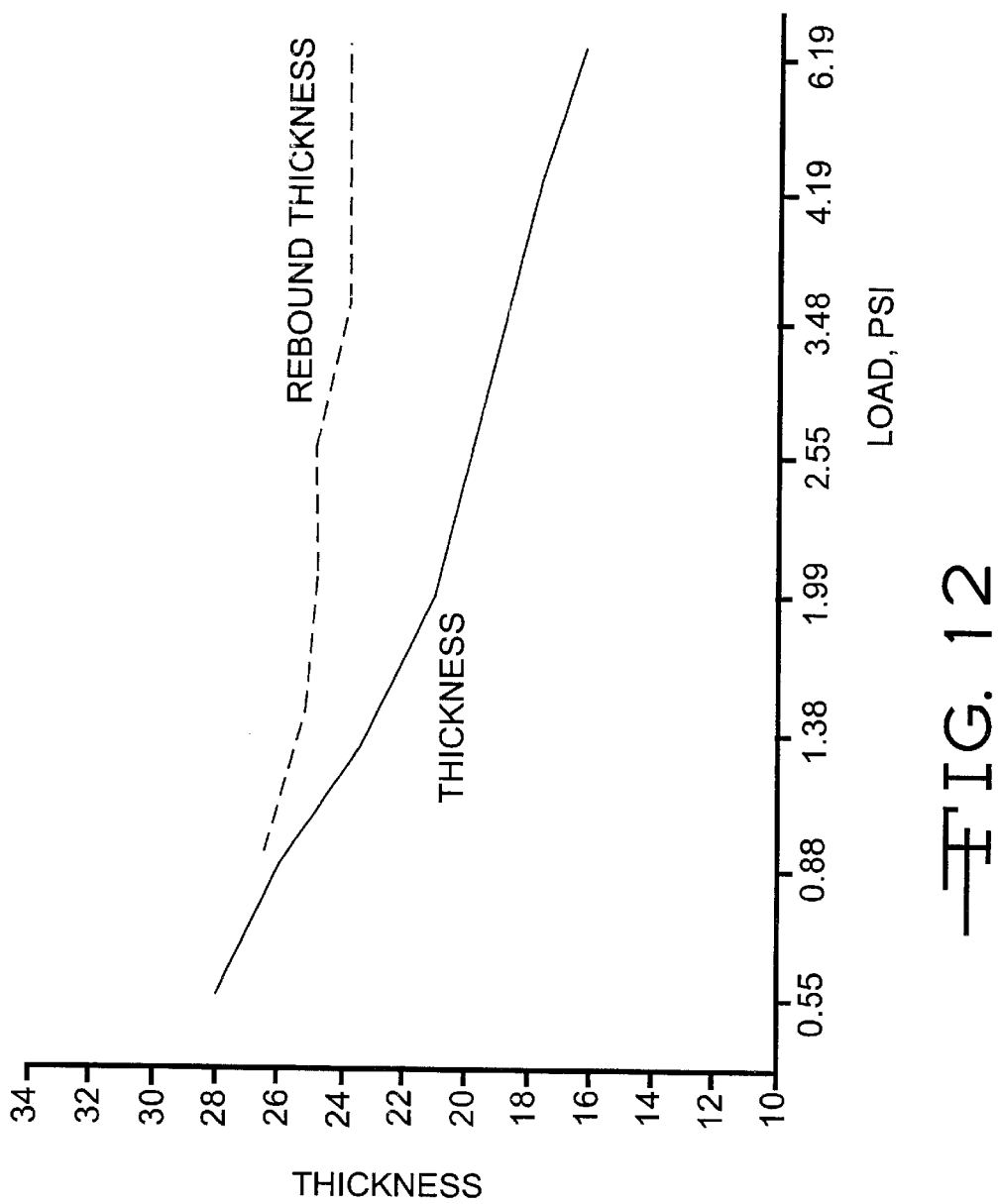
Figure 13:
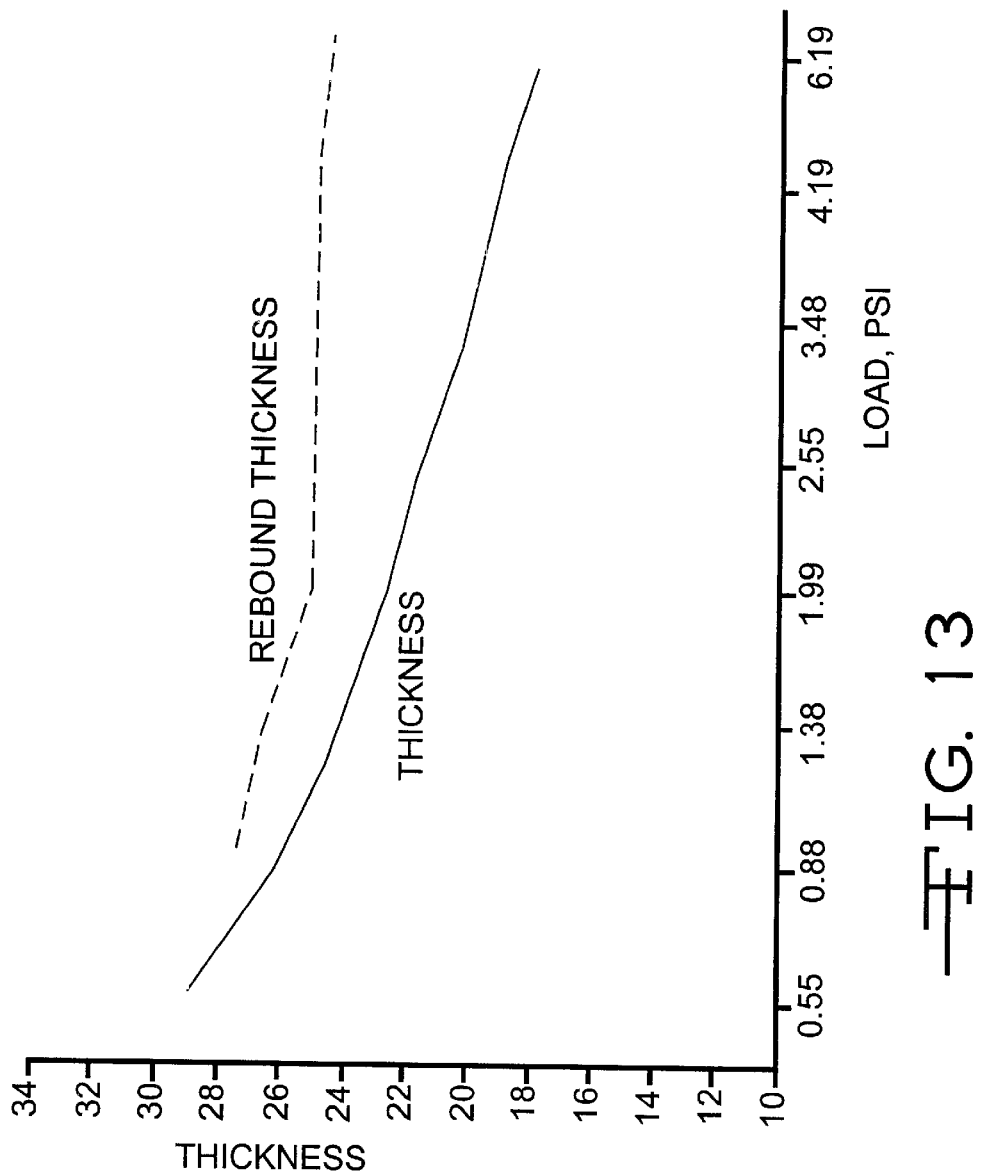
Figure 14:
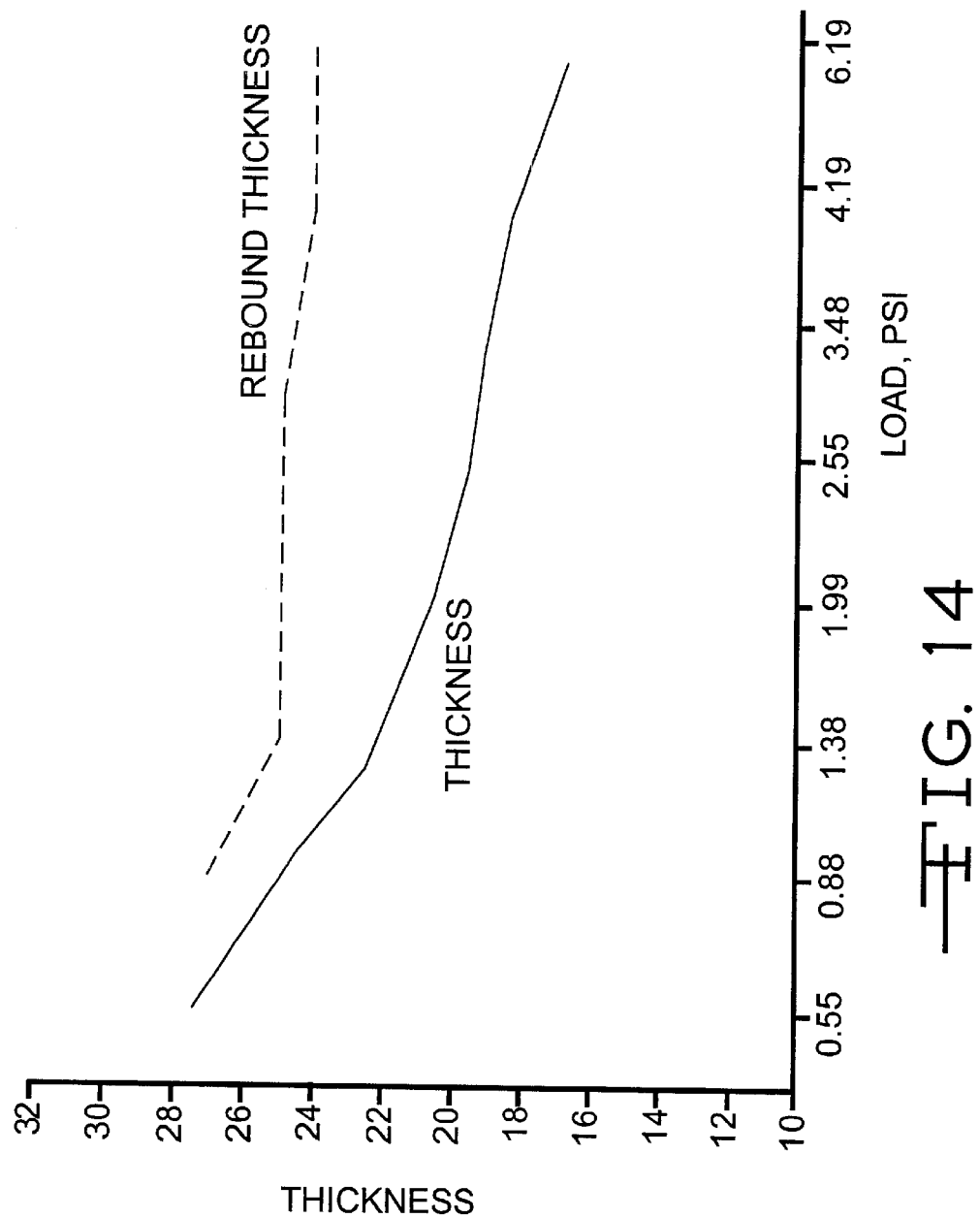
Figure 15:
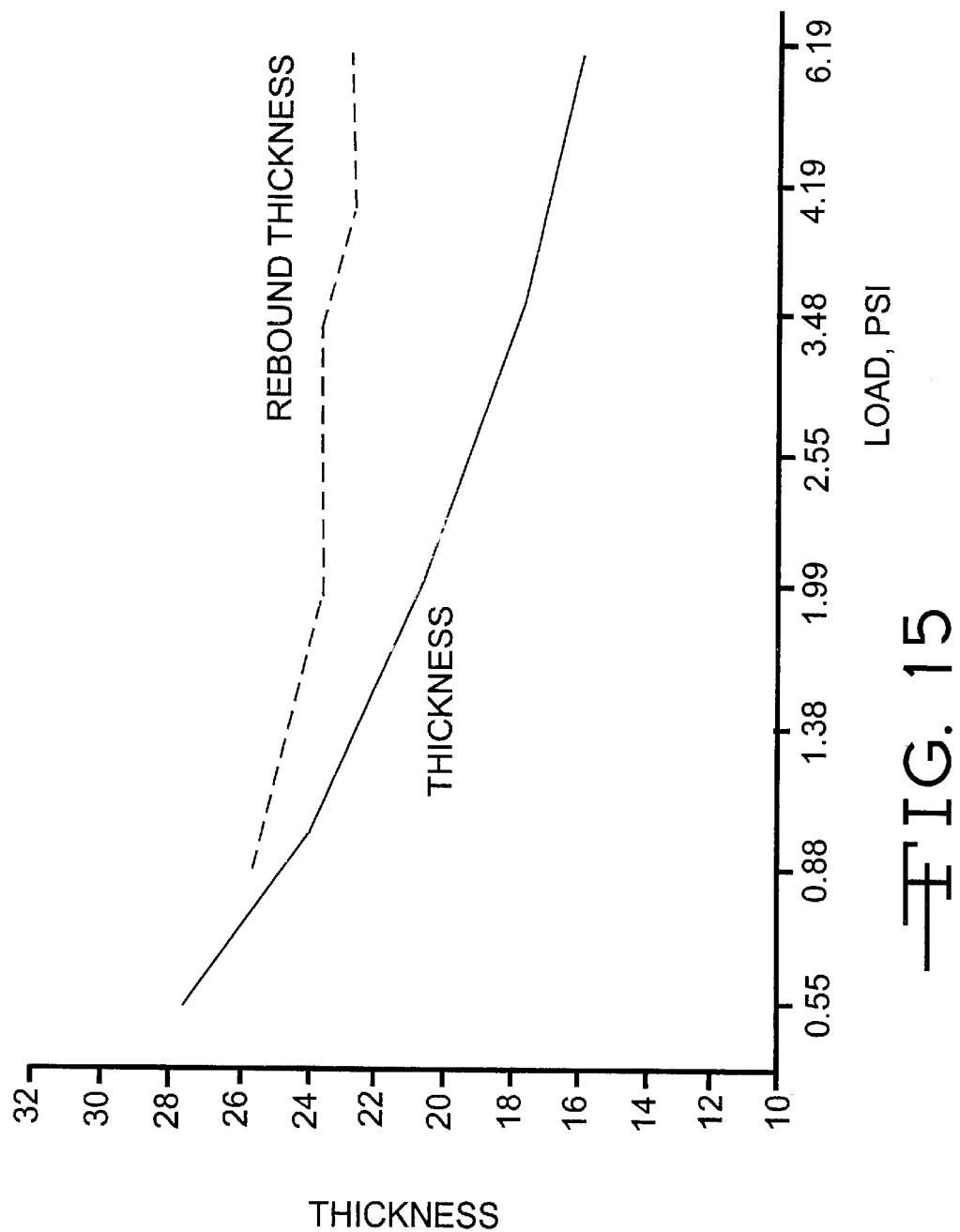

The data in Table I are presented graphically in FIG. 3, which was computer generated by entering data for the battery of the invention and for the control after cycles 1 through 7, but entering zero for the percent of initial capacity after cycles 8 through 20.

EXAMPLES 2–6

Glass fiber separator hand sheets were also produced from other furnishes which contained varying amounts of kraft pulp that had been beaten to a consistency of 0.9906 percent and a Canadian freeness of 57 cc. The furnishes also contained the previously identified Schuller 206, 210X and A20-BC-½ inch glass fibers. The hind sheets were produce in a laboratory apparatus by depositing a furnish on a wire or screen, and draining the furnish. The apparatus comprised a tank with a screen in the bottom, a drain below the screen, a valve which opened and closed the drain, and paddles which were moved back and forth to simulate the movement of a furnish in commercial papermaking apparatus and establish a "machine direction" parallel to the direction of paddle movement. The furnish and the pulp were stirred for about two minutes, after which the valve was opened so that the water drained through the screen while the separator was retained on the screen. The furnish that was charged contained enough glass fibers, to produce a separator having a grammage of 30 g/m$^2$ at a thickness of 0.15 mm. The separator hand sheet was heated in a drying oven to about 150° for 30 minutes. The final compositions, in percent w/w, of representative ones of the furnishes and the properties of the hand sheets that were produced are set forth in Table II, below, where, as in other tables herein, unless otherwise indicated, tensile strength is in pounds per inch of width of the separator (multiply times 0.175 to convert to kilonewtons per meter), elongation is in percent, stiffness is "Gurley Stiffness" in mg, pore sizes are in μm, electrical resistance is in ohms per square inch of the separator, and loss on ignition is in percent w/w. The compositions of the furnishes are given in the following table:

| Composition of furnish | Example 2 | Example 3 | Example 4 | Example 5 | Example 6 |
|---|---|---|---|---|---|
| 210 X | 79 | 77 | 73 | 70 | 65 |
| A20-BC ½ inch fibers | 10 | 10 | 10 | 10 | 10 |
| 206 | 10 | 10 | 10 | 10 | 10 |
| Cellulose | 1 | 3 | 7 | 10 | 15 |

TABLE II

| Property | Example 2 | Example 3 | Example 4 | Example 5 | Example 6 |
|---|---|---|---|---|---|
| grammage, g/m² | 119.9 | 121.7 | 119.3 | 119.9 | 119.4 |
| Thickness, mm | | | | | |
| (10.34 KPA) | 0.765 | 0.850 | 0.653 | 0.620 | 0.591 |
| (20 KPa) | 0.726 | 0.753 | 0.644 | 0.590 | 0.570 |
| Tensile, Newtons/m | | | | | |
| MD | 71.7 | 135.0 | 135.7 | 139.2 | 149.5 |
| CD | 84.7 | 117.8 | 108.9 | 125.4 | 130.2 |
| Elongation | | | | | |
| Percent MD | 1.37 | 2.00 | 1.96 | 2.08 | 2.13 |
| CD | 1.83 | 1.67 | 1.61 | 1.70 | 1.92 |
| Frazier Pemeability | 65.7 | 50.2 | 13.4 | 5.9 | n.d. |
| Wicking seconds/10 mm | 83 | 89 | 104 | 153 | 247 |
| Stiffness, mg | | | | | |
| MD | 3800 | 3900 | 5200 | 4300 | 3200 |
| CD | 3100 | 3500 | 3900 | 3500 | 3000 |
| Pore Size-first Bubble Method, μm | 16.5 | 16.0 | 20.1 | 21.6 | 24.0 |
| Electrical Resistance | 0.002 | 0.003 | 0.009 | 0.011 | 0.014 |
| LOI, % | 3.3 | 5.2 | 9.0 | 12.5 | 18.1 |
| Pore size-liquid Porosimetry Coulter, μm | | | | | |
| Min | 5.570 | 5.386 | 3.734 | 2.628 | 1.697 |
| Max | 42.24 | 42.24 | 26.07 | 17.80 | 12.43 |
| Mean | 8.875 | 8.507 | 5.753 | 4.425 | 3.497 |

In the foregoing table and in subsequent tables the entry "n.d." means not determined, in the cases of Examples 6 and 11, because the porosity was too low for a determination of Frazier Permeability.

Control glass fiber separator hand sheets were produced by the same method from a furnish which was composed of 80 percent w/w of Schuller 210X glass fibers, 1.0 percent w/w of A20-BC-½ inch glass fibers and 10 percent w/w Schuller 206 glass fibers. The average test results for two control sheets are set forth in Table III, below:

TABLE III

| | |
|---|---|
| Grammage, g/m² | 117.1 |
| Thickness, mm | |
| (10.34 KPA) | 0.857 g/m² |
| (20 KPa) | 0.717 g/m² |
| Tensile, Newtons per M | |
| MD | 10.8 |
| CD | 11.0 |
| Elongation, % | |
| MD | 0.70 |
| CD | 1.21 |
| Frazier Permeability | 178.4 |
| Wicking seconds/10 mm | 62 |
| Stiffness, mg | |
| MD | 980 |
| CD | 655 |
| Pore Size-first bubble Method, μm | 11.0 |
| Pore size-liquid porosimetry, Coulter, μm | |
| Min | 6.86 |
| Max | 65.97 |
| Mean | 12.98 |
| Electrical Resistance | n.d. |
| LOI, % | 0.31 |

Thickness in mm×1000 of samples of the hand sheets produced as described in Examples 2 through 6 and of the control sheets was also determined under various loads, both in an as produced condition and after having been wet with 7 times its dry weight of sulfuric acid, specific gravity 1.286. All thicknesses reported herein were determined by the method described in U.S. Pat. No. 5,336,275, The example numbers are column headings in Table IV, below, and thicknesses (the values reported are measured thicknesses in mm×1000) when the, samples were in the as produced condition, at applied loads in KPa indicated in the left column, are set forth under the identifying headings:

TABLE IV

| Applied Load, KPa | Control | Ex. 2 | Ex. 3 | Ex. 4 | Ex. 5 | Ex. 6 |
|---|---|---|---|---|---|---|
| 3.79 | 38 | 36.5 | 31 | 28.5 | 26 | 27 |
| 6.06 | 35 | 30.5 | 26 | 25.5 | 23 | 22 |
| 9.51 | 29.5 | 27.5 | 23 | 23.5 | 21 | 19.5 |
| 13.71 | 25.5 | 25.5 | 21 | 22.5 | 20 | 18.5 |
| 17.57 | 22 | 23.5 | 20 | 21.5 | 19 | 17.5 |
| 23.98 | 20 | 22.5 | 18.5 | 20 | 19 | 17 |
| 28.87 | 19 | 21.5 | 17.5 | 19.5 | 18 | 16.5 |
| 42.65 | 16.5 | 19 | 16.5 | 18.5 | 17 | 15.5 |

"Rebound" thicknesses in mm×1000 (after the excess of the load above 3.79 KPa was removed from each "as produced" sample) are given in Table V, under headings which give the load that was applied, and from which each sample "rebounded"; the values reported are 1000× thicknesses in mm at the loads indicated in the left column of the table:

TABLE V

| Applied Load, KPa | Control | Ex. 2 | Ex. 3 | Ex. 4 | Ex. 5 | Ex. 6 |
|---|---|---|---|---|---|---|
| 6.06 | 36 | 33.5 | 28.5 | 27.5 | 24.5 | 26.5 |
| 9.51 | 33.5 | 30.5 | 29 | 26.5 | 23.5 | 25.5 |
| 13.71 | 31.5 | 29.5 | 27 | 25.5 | 22.5 | 26 |
| 17.57 | 29.5 | 28.5 | 25.5 | 25.5 | 22.5 | 26 |
| 23.98 | 29 | 27.5 | 25 | 25.5 | 22.5 | 25 |
| 28.87 | 28 | 27.5 | 25 | 24.5 | 22 | 23.5 |
| 42.65 | 27 | 27 | 24 | 24.5 | 22 | 23 |

The data in Tables IV and V are presented graphically in computer generated FIGS. 4 through 9 of the drawings, where the loads are shown in psi, and successive points along the X axis, which are equally spaced from one another, represent 0.55 psi (3.79 KPa), 0.88 psi (6.06 KPa), 1.38 psi (9.51 KPa), 1.99 psi (13.71 KPa), 2.55 psi (17.57 KPa), 3.48 psi (23.98 KPa), 4.19 psi (28.87 KPa), and 6.19 psi (42.65 KPa). Accordingly, FIGS. 4 through 9 are skewed in the sense that, for example, a given distance between the first and second points represents a change from 0.55 psi (3.79 KPa) to 0.88 psi (6.06 KPa), while the same distance between the last two points represents a change from 4.19 psi (28.87 KPa) to 6.19 psi (42.65 KPa). In order to represent the data from the control sheets and from Example 2 in a more nearly conventional plot, thickness and rebound thickness (in mm×1000) were calculated by interpolation from the experimental data for loads of 0.69 psi (4.75 KPa), 1.19 psi (8.20 KPa), 1.69 psi (11.64 KPa), 2.19 psi (15.09 KPa), 2.69 psi (18.53 KPa), 3.19 (21.98 KPa), 3.69 psi (25.42 KPa), 4.69 psi (32.31 KPa), 5.19 psi (35.76 KPa), and 5.69 psi (39.20 KPa). These and the experimental values (in mm×1000) at 4.19 psi (28.86 KPa) and at 6.19 psi (42.65 KPa) are set forth in Tables VI and VII, respectively:

TABLE VI

| Applied Load, KPa | Control, thickness | Example 2, thickness | Control, Rebound | Example 2, Rebound |
|---|---|---|---|---|
| 4.75 | 36.7 | 34 | | |
| 8.20 | 31.6 | 28.6 | 34.8 | 32 |
| 11.64 | 28.0 | 26.7 | 32.3 | 30 |
| 15.09 | 24.3 | 24.8 | 30.5 | 29.6 |
| 18.53 | 22.8 | 23.8 | 29.5 | 28.4 |
| 21.98 | 20.6 | 22.8 | 29.2 | 28.4 |
| 25.42 | 20.3 | 22.7 | 28.7 | 27.5 |
| 28.86 | 30 | 22.5 | 28 | 27.5 |
| 32.31 | 19.2 | 21.7 | 27.8 | 27.4 |
| 35.76 | 18.3 | 20.8 | 27.5 | 27.3 |
| 39.20 | 17.4 | 20.2 | 27.3 | 27.2 |
| 42.65 | 16.5 | 19 | 27 | 27 |

Figure 16:
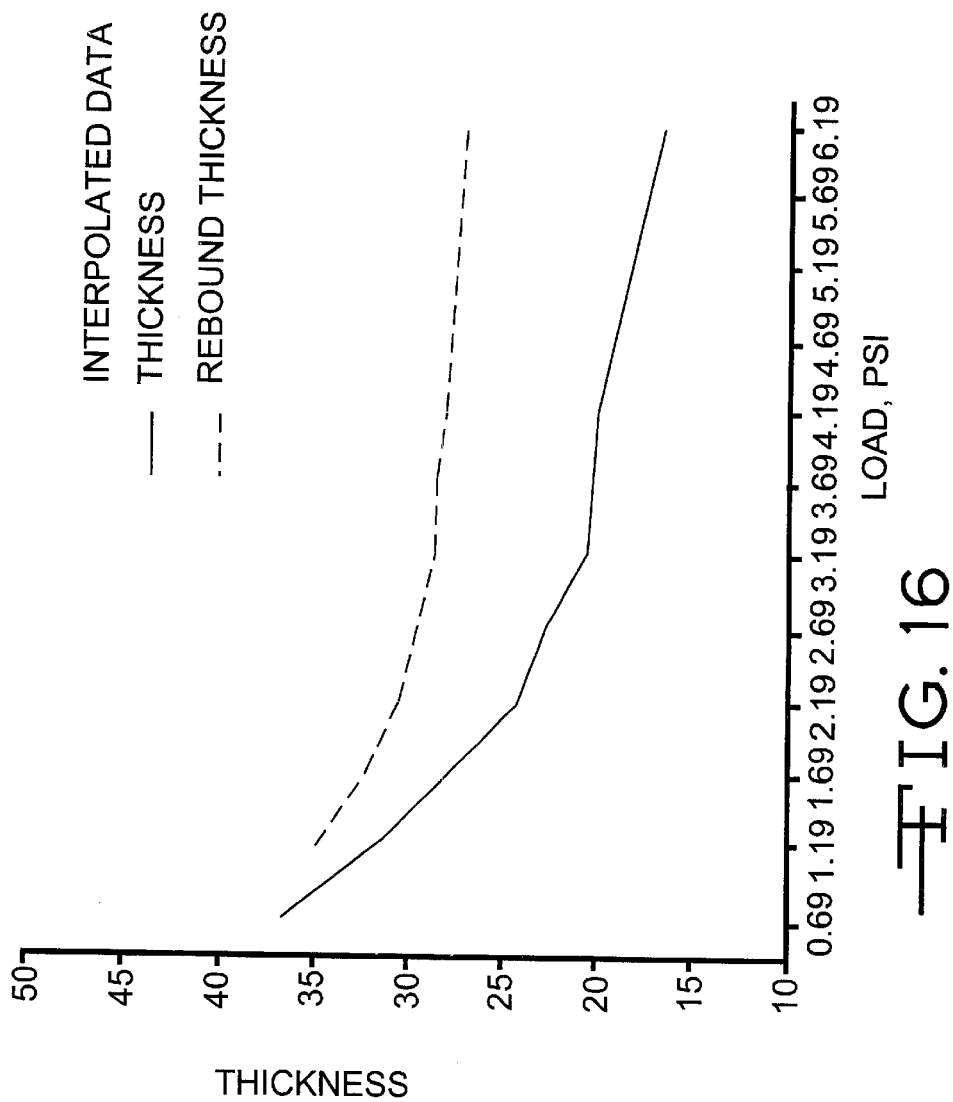
FIGS. 16 and 17 are plots similar to FIGS. 4 and 5, differing in that interpolated points are plotted in the former, so that successive points along the X axis represent equal increments of cellulose content, while experimental values are plotted in the latter and, as a consequence, as is subsequently explained herein, successive points along the X axis do not always represent equal increments of cellulose content.
Figure 17:
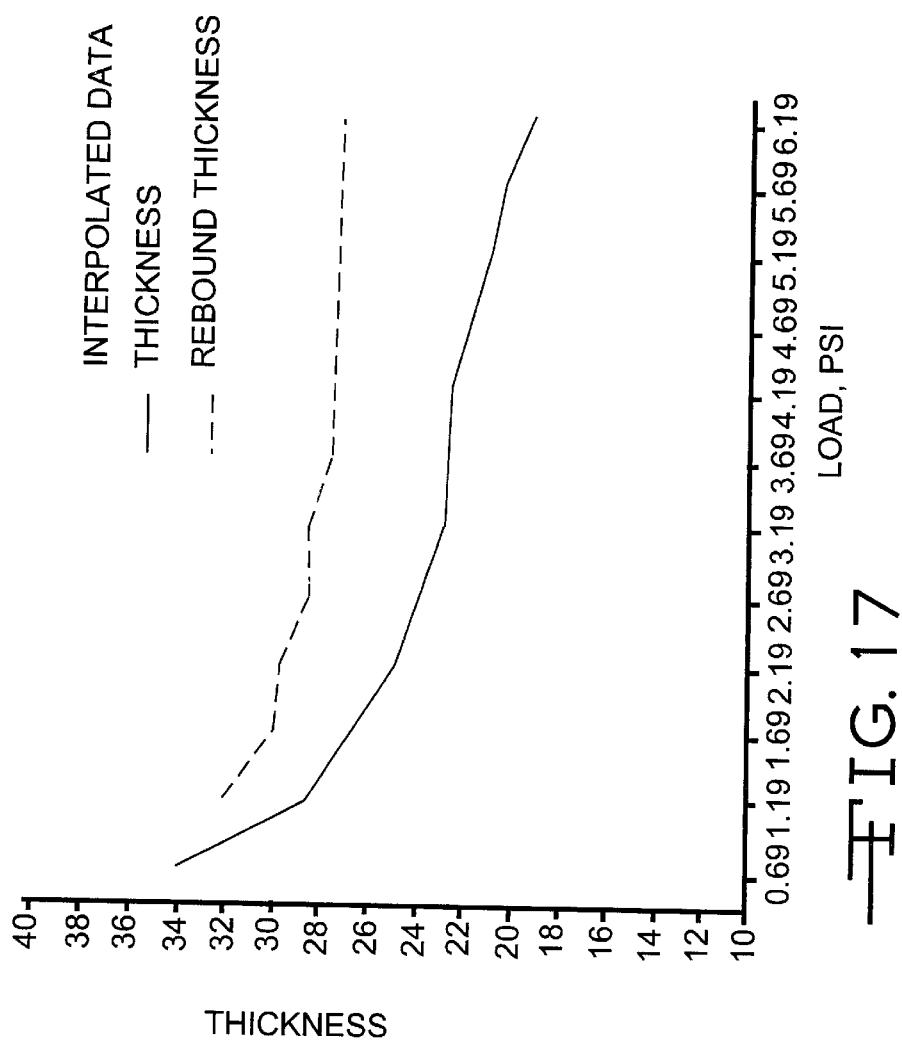

The data from Table VI are presented graphically in FIGS. 16 and 17, which are computer generated plots using loads in KPa. It will be noted that the curves of FIGS. 16 and 17 are similar in shape to those of the corresponding curves of FIGS. 4 and 5, which is deemed to indicate that valid conclusions can be reached from the skewed curves.

Thickness and rebound thickness measurements were also made on the separator materials of Examples 2 through 6 and the controls after the materials had been wet with sulfuric acid having a specific gravity of 1.286. The applied loads in KPa are given in the left hand column of Table VII, below, and thicknesses are set forth under the headings which identify the samples; the reported thicknesses are 1000 times the measured thicknesses of the separator in mm:

TABLE VII

| Applied load, KPa | Control | Ex. 2 | Ex. 3 | Ex. 4 | Ex. 5 | Ex. 6 |
|---|---|---|---|---|---|---|
| 3.79 | 36 | 20.5 | 28 | 29 | 27.5 | 27.5 |
| 6.06 | 31.5 | 27 | 26 | 26 | 25 | 24.5 |
| 9.51 | 28.5 | 24 | 23 | 24 | 22 | 22.5 |
| 13.91 | 26.5 | 22.5 | 21 | 22.5 | 20.5 | 20.5 |
| 17.57 | 24 | 21.5 | 20 | 21.7 | 19.5 | 19 |
| 23.98 | 20.5 | 20.5 | 19 | 20 | 19 | 17.5 |
| 28.87 | 19 | 19.5 | 18 | 19 | 18 | 16.5 |
| 42.65 | 17.5 | 17.5 | 16.5 | 17.5 | 16.5 | 15.5 |

"Rebound" thicknesses (after the excess of the load above 3.79 KPa was removed from each sample that had been wet with sulfuric acid) are given in Table VIII, below, adjacent entries in the left hand column which give the load that was applied, and from which each sample "rebounded"; the values reported are 1000×measured thicknesses in mm):

TABLE VIII

| Applied load, KPa | Control | Ex. 2 | Ex. 3 | Ex. 4 | Ex. 5 | Ex. 6 |
|---|---|---|---|---|---|---|
| 6.06 | 32.5 | 27.5 | 26.5 | 27.5 | 27 | 25.5 |
| 9.51 | 31 | 25.5 | 25.5 | 26.5 | 25 | 24.5 |
| 13.91 | 29 | 25.5 | 25 | 25 | 25 | 23.5 |
| 17.57 | 27.5 | 25.5 | 25 | 25 | 25 | 23.5 |
| 23.98 | 24.5 | 24.5 | 24 | 95 | 24.5 | 23.5 |
| 28.87 | 24 | 24.5 | 24 | 25 | 24 | 22.5 |
| 42.65 | 23.5 | 24.5 | 24 | 24.5 | 24.5 | 22.5 |

The data from Tables VII and VIII are plotted in FIGS. 10 through 15, where loads are in KPa. The data of Tables IV, V, VII and VIII and FIGS. 4–15 indicate that the separator materials of Examples 2 through 6, above, all have sufficient resiliency that they can be compressed between the plates of a lead acid battery, and that their major surfaces will be urged against the adjacent plates with sufficient force for the battery to perform satisfactorily.

EXAMPLES 7–11

Glass fiber separator hand sheets were also produced by the method described in Example 1 from other furnishes which contained varying amounts of kraft pulp that had been beaten to a consistency of 0.9906 percent and a Canadian freeness of 57 cc, and were then dipped in a latex, 3 percent w/w solids. The final compositions, in percent w/w, of representative ones of the furnishes are set forth in Table IX, below, and the properties of separators produced from the furnishes are set forth in Table X, below, where thickness of the separator material is in mm:

TABLE IX

| Composition of Furnish | Example 7 | Example 8 | Example 9 | Example 10 | Example 11 |
|---|---|---|---|---|---|
| 210 X | 79 | 77 | 73 | 70 | 65 |
| A20-BC | 10 | 10 | 10 | 10 | 10 |
| ½ inch fibers 206 | 10 | 10 | 10 | 10 | 10 |
| Cellulose | 1 | 3 | 7 | 10 | 15 |

TABLE X

| Property | Example 7 | Example 8 | Example 9 | Example 10 | Example 11 |
|---|---|---|---|---|---|
| grammage g/m$^2$ | 121.6 | 121.9 | 127.5 | 123.1 | 122.7 |
| Thickness, mm | | | | | |
| (10.34 KPa) | 0.792 | 0.778 | 0.750 | 0.742 | 0.603 |
| (20 KPa) | 0.760 | 0.745 | 0.720 | 0.698 | 0.585 |
| Tensile Newtons/m | | | | | |
| MD | 93.0 | 120.6 | 139.2 | 152.3 | 168.8 |
| CD | 80.6 | 102.0 | 122.0 | 139.2 | 158.5 |
| Elongation, | | | | | |
| Percent MD | 1.8 | 2.3 | 1.9 | 2.3 | 1.9 |
| CD | 1.5 | 2.1 | 2.0 | 2.1 | 2.0 |
| Frazier Permeability | 8.97 | 5.08 | 1.39 | 0.918 | n.d. |
| Wicking seconds/10 mm | 225 | 184 | 253 | 261 | 391 |

TABLE X-continued

| Property | Example 7 | Example 8 | Example 9 | Example 10 | Example 11 |
|---|---|---|---|---|---|
| Stiffness, mg | | | | | |
| MD | 2500 | 3400 | 4300 | 4700 | 4600 |
| CD | 2200 | 2800 | 3900 | 3900 | 3700 |
| Pore Size-First Bubble Method, μm | 16.8 | 16.1 | 19.4 | 20.5 | 25.4 |
| Pore size-liquid Porosimetry Coulter, μm | | | | | |
| Min | 5.283 | 4.726 | 3.427 | 2.285 | 1.092 |
| Max | 46.54 | 40.89 | 27.52 | 21.73 | 11.88 |
| Mean | 9.550 | 7.881 | 5.839 | 4.902 | 2.920 |
| LOI, % | 6.7 | 8.4 | 12.7 | 17.1 | 21.3 |

EXAMPLES 12–16

Still other glass fiber separator hand sheets were produced by the method described in Example 1 from substantially the furnish of Examples 7–11 which contained various small amounts of kraft pulp that had been beaten to a consistency of 1.235 percent and a Canadian freeness of 57 cc. The final compositions, in percent w/w, of representative ones of the furnishes are set forth in Table XI, below, and their properties are set forth in Table XII, below, where thickness is in mm:

TABLE XI

| Composition of Furnish | Example 12 | Example 13 | Example 14 | Example 15 | Example 16 |
|---|---|---|---|---|---|
| 210 X | 77 | 79 | 79¼ | 79½ | 79¾ |
| A20-BC ½ inch fibers | 10 | 10 | 10 | 10 | 10 |
| 206 | 10 | 10 | 10 | 10 | 10 |
| Cellulose | 3 | 1 | ¾ | ½ | ¼ |

TABLE XII

| Property | Example 12 | Example 13 | Example 14 | Example 15 | Example 16 |
|---|---|---|---|---|---|
| grammage g/m² | 118.4 | 115.6 | 117.2 | 116.4 | 116.3 |
| Thickness, mm | | | | | |
| (10.34 KPa) | 0.757 | 0.751 | 0.778 | 0.774 | 0.797 |
| (20 KPa) | 0.662 | 0.694 | 0.716 | 0.703 | 0.722 |
| Tensile Newtons/m | | | | | |
| MD | 49.5 | 25.3 | 23.8 | 20.0 | 18.5 |
| CD | 43.8 | 20.2 | 20.7 | 20.0 | 2.54 |
| Percent Elongation | | | | | |
| MD | 8.41 | 5.75 | 6.58 | 6.68 | 7.82 |
| CD | 8.23 | 6.48 | 6.06 | 6.13 | 8.89 |
| Frazier Permeability | 129.6 | 175.2 | 175.2 | 186.4 | 200.8 |
| Wicking seconds/10 mm | 74 | 76 | 72 | 67 | 62 |
| Surface area Corr. | 0.6874 9.9970 | 0.6114 9.9962 | 0.6603 9.9991 | 0.6513 9.9962 | 0.7030 9.9970 |
| Pore size-liquid | | | | | |

TABLE XII-continued

| Property | Example 12 | Example 13 | Example 14 | Example 15 | Example 16 |
|---|---|---|---|---|---|
| Porosimetry, Coulter, μm | | | | | |
| Min | 6.050 | 5.941 | 7.050 | 6.496 | 7.589 |
| Max | 44.71 | 50.49 | 62.08 | 70.13 | 78.26 |
| Mean | 10.65 | 12.04 | 12.32 | 12.59 | 12.17 |
| LOI | 0.46 | 1.56 | 1.28 | 0.89 | 0.75 |

Control glass fiber separator hand sheets were produced by the same method from a furnish which was composed of 80 percent w/w of Schuller 210X glass fibers, 10 percent w/w of A-20-BC ½ inch glass fibers and 10 percent w/w Schuller 206 glass fibers. The test results, average of two, are set forth in Table XIII, below, where thickness is in mm:

TABLE XIII

| grammage, g/m² | 113.7 |
|---|---|
| Thickness, mm | |
| (10.34 KPa) | 0.742 |
| (20 KPa) | 0.600 |
| Tensile Newtons/m | |
| MD | 10.1 |
| CD | 11.0 |
| Elongation, % | |
| MD | 0.96 |
| CD | 1.27 |
| Frazier Permeability | 222.4 |
| Wicking seconds/10 mm | 62 |

The data concerning Frazier permeability from Table X (Examples 12 through 16) and from Table XI (for the corresponding controls) are presented graphically in FIG. 1, which is a computer generated plot of Frazier permeability (called CFM on the drawing) vs. cellulose content. It will be noted that FIG. 1 has points on the X axis for 1.25, 1.5, 1.75. 2.0, 2.25, 2.5 and 2.75 percent pulp. To cause the plot to show these points, for which there was no experimental data, Frazier permeability was calculated for each of these pulp contents by interpolation between the experimental values at 1.0 percent and at 3.0 percent. The experimental and calculated data input to generate FIG. 2 are set forth below:

| Percent w/w cellulose | Frazier Permeability |
|---|---|
| 0.0 | 27.8 |
| 0.25 | 25.05 |
| 0.5 | 23.25 |
| 0.75 | 21.9 |
| 1.0 | 21.85 |
| 1.25 (Calc) | 21.14 |
| 1.5 (Calc) | 20.44 |
| 1.75 (Calc) | 19.73 |
| 2.0 (Calc) | 19.03 |
| 2.25 (Calc) | 18.32 |
| 2.5 (Calc) | 17.61 |
| 2.75 (Calc) | 16.91 |
| 3.0 | 16.2 |

Figure 2:
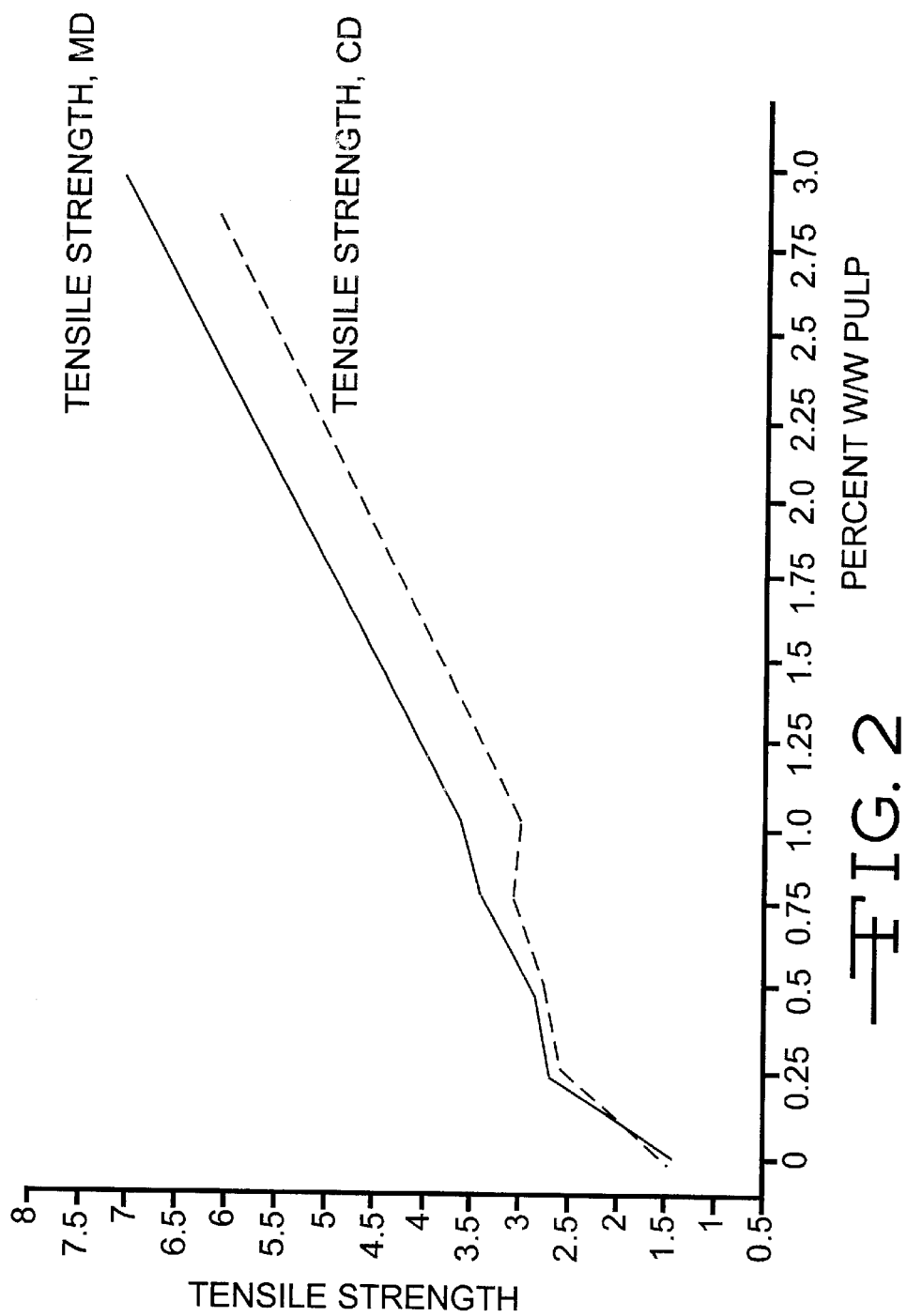
FIG. 2 is a plot of tensile strength, both machine direction ("Tensile, MD") and cross direction ("Tensile, CD"), vs. percent w/w of added cellulose in glass fiber battery separator according to the invention.

The data concerning tensile strength from Table XII and from Table XIII are presented graphically in FIG. 2, which is composed of two computer generated plots of tensile strength in pounds per inch (machine direction, in one case, and cross direction in the other) vs. cellulose content. It will be noted that FIG. 2 has points on the X axis for 1.25, 1.5, 1.75, 2.0, 2.25, 2.5 and 2.75 percent pulp. To cause the plot to show these ordinate points, for which there was no experimental data, tensile strength in both directions was calculated for each of these pulp contents by interpolation between the experimental values at 1.0 percent and at 3.0 percent. The experimental and calculated data input to generate FIG. 2 are set forth below:

| Percent w/w cellulose | |
|---|---|
| | Tensile, MD (Pounds per inch) |
| 0.0 | 1.46 |
| 0.25 | 2.685 |
| 0.5 | 2.90 |
| 0.75 | 2.455 |
| 1.0 | 3.63 |
| 1.25 (Calc) | 4.07 |
| 1.5 (Calc) | 4.52 |
| 1.75 (Calc) | 4.96 |
| 2.0 (Calc) | 5.41 |
| 2.25 (Calc) | 5.85 |
| 2.5 (Calc) | 6.29 |
| 2.75 (Calc) | 6.74 |
| 3.0 | 7.18 |
| | Tensile, CD (Pounds per inch) |
| 0.0 | 1.55 |
| 0.25 | 2.54 |
| 0.5 | 2.72 |
| 0.75 | 3.005 |
| 1.0 | 2.93 |
| 1.25 (Calc) | 3.36 |
| 1.5 (Calc) | 3.79 |
| 1.75 (Calc) | 4.22 |
| 2.0 (Calc) | 4.65 |
| 2.25 (Calc) | 5.07 |
| 2.5 (Calc) | 5.50 |
| 2.75 (Calc) | 5.93 |
| 3.0 | 6.36 |

If the calculated data were not plotted, the computer generated plot would move the point representing 3.0 percent w/w pulp to the left to the point which represents 1.25 percent w/w pulp in FIG. 2, so that the curves would rise sharply from tensile strengths of 1.93 and 3.63 at 1.0 percent w/w pulp to tensile strengths of 6.36 and 7.10 at 3.0 percent w/w pulp, but the distance along the X axis from 1.0 to 3.0 would be the same as the distance from 0.75 to 1.0.

EXAMPLES 17–24

Still other glass fiber separator hand sheets were produced by the method described in Example 1 from furnishes containing 35 parts by weight of 206 glass fibers, 65 parts by weight of 210 glass fibers and about 1–2 parts by weight of kraft pulp that had been beaten to various Canadian freenesses. The Canadian freeness of representative ones of the furnishes and various properties of the separators produced therefrom are set forth in Table XIV, below, where thickness is in mm. Because of the small size of the samples and lack of uniformity of the furnishes, the loss on ignition ("LOI") of the hand sheets is the best indication of the cellulose content of the furnish from which it was produced. A hand sheet containing no cellulose can be expected to have a loss on ignition of about ½c/c.

TABLE XIV

| Property | Example 17 | Example 18 | Example 19 | Example 20 |
|---|---|---|---|---|
| Canadian Freeness | 660 | 548 | 420 | 225 |
| Grammage g/m² | 147 | 143 | 141 | 143 |
| Thickness, mm | | | | |
| 10 KPa | 0.96 | 0.92 | 0.88 | 0.89 |
| 20 KPa | 0.84 | 0.81 | 0.82 | 0.88 |
| 50 KPa | 0.79 | 0.70 | 0.70 | 0.68 |
| Average total tensile, pounds per inch | 1.8 | 2.3 | 2.3 | 1.9 |
| Average elongation, % | 2.2 | 2.4 | 2.8 | 2.1 |
| Loss on ignition, % | 1.6 | 1.3 | 2.0 | 1.7 |
| Average Tensile g/m² | 0.0122 | 0.0161 | 0.0163 | 0.0133 |

| Property | Example 21 | Example 22 | Example 23 | Example 24 |
|---|---|---|---|---|
| Canadian Freeness | 120 | 40 | 30 | 20 |
| Grammage g/m² | 143 | 142 | 137 | 146 |
| Thickness, mm | | | | |
| 10 KPa | 0.97 | 0.91 | 0.94 | 0.92 |
| 20 KPa | 0.84 | 0.80 | 0.82 | 0.82 |
| 50 KPa | 0.73 | 0.70 | 0.70 | 0.72 |
| Average total tensile, pounds per inch | 2.4 | 2.5 | 3.0 | 4.5 |
| Average elongation, % | 2.2 | 2.3 | 2.3 | 2.5 |
| Loss on ignition, % | 1.8 | 1.5 | 1.8 | 2.6 |
| Average Tensile g/m² | 0.0133 | 0.0176 | 0.0219 | 0.0308 |

EXAMPLES 25–32

Still other glass fiber separator hand sheets were produced by the method described in Example 1 from furnishes containing 35 parts by weight of 206 glass fibers, 65 parts by weight of 210 glass fibers and 3–5 parts by weight of kraft pulp that had been beaten to various Canadian freenesses. The Canadian freeness of representative ones of the furnishes and various properties of the separators produced therefrom are set forth in Table XV, below, where thickness is in mm:

TABLE XV

| Property | Example 25 | Example 26 | Example 27 | Example 28 |
|---|---|---|---|---|
| Canadian Freeness | 660 | 548 | 420 | 225 |
| Grammage g/m² | 148 | 144 | 138 | 141 |
| Average total tensile, pounds per inch | 2.6 | 3.0 | 2.7 | 2.8 |
| Average elongation, % | 1.9 | 2.5 | 3.1 | 2.2 |
| Loss on ignition, % | 3.5 | 3.7 | 3.8 | 4.0 |
| Average Tensile g/m² | 0.0176 | 0.0208 | 0.0196 | 0.0199 |

TABLE XV-continued

| Property | Example 29 | Example 30 | Example 31 | Example 32 |
|---|---|---|---|---|
| Canadian Freeness | 120 | 40 | 30 | 20 |
| Grammage g/m² | 141 | 140 | 141 | 141 |
| Average total tensile, pounds per inch | 3.5 | 3.5 | 5.1 | 7.0 |
| Average elongation, % | 1.9 | 2.0 | 2.1 | 2.0 |
| Loss on ignition, % | 4.5 | 3.6 | 3.6 | 4.1 |
| Average Tensile g/m² | 0.0248 | 0.0250 | 0.0362 | 0.0496 |

EXAMPLES 33–40

Still other glass fiber separator hand sheets were produced by the method described in Example 1 from furnishes containing 35 parts by weight of 206 glass fibers, 65 parts by weight of 210 glass fibers and 9 to 11 parts by weight of kraft pulp that had been beaten to various Canadian freeness. The Canadian freeness of representative ones of the furnishes and various properties of the separators produced therefrom are set forth in Table XIV, below, where thickness is in mm:

TABLE XVI

| Property | Example 33 | Example 34 | Example 35 | Example 36 |
|---|---|---|---|---|
| Canadian Freeness | 660 | 548 | 420 | 225 |
| Grammage g/m² | 148 | 146 | 140 | 145 |
| Average total tensile, pounds per inch | 2.5 | 3.8 | 4.5 | 5.1 |
| Average elongation, % | 2.1 | 2.1 | 2.1 | 2.0 |
| Loss on ignition, % | 11.3 | 11.5 | 8.7 | 10.0 |
| Average Tensile g/m² | 0.0169 | 0.0261 | 0.0319 | 0.0364 |

| Property | Example 37 | Example 38 | Example 39 | Example 40 |
|---|---|---|---|---|
| Canadian Freeness | 120 | 40 | 30 | 20 |
| Grammage g/m² | 138 | 144 | 140 | 150 |
| Average total tensile, pounds per inch | 6.9 | 7.8 | 9.0 | 13.3 |
| Average elongation, % | 2.0 | 2.3 | 1.8 | 2.2 |
| Loss on ignition, % | 12.0 | 10.6 | 11.5 | 11.0 |
| Average Tensile g/m² | 0.0500 | 0.0542 | 0.0643 | 0.0887 |

Figure 18:
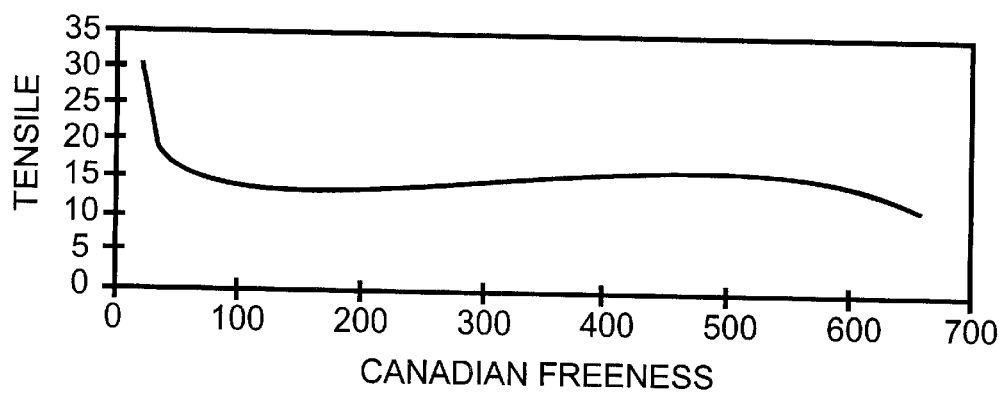
FIGS. 18, 19 and 20 are plots of the data of Examples 17–40 concerning average tensile strength in g/m² vs. Canadian Freeness.
Figure 19:
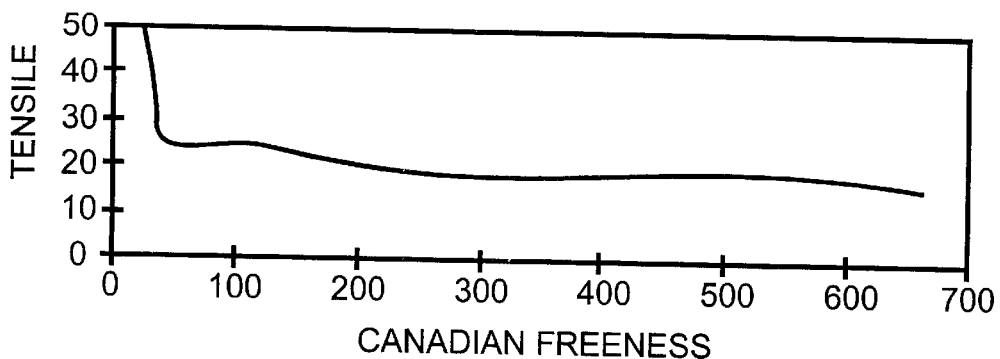
Figure 20:
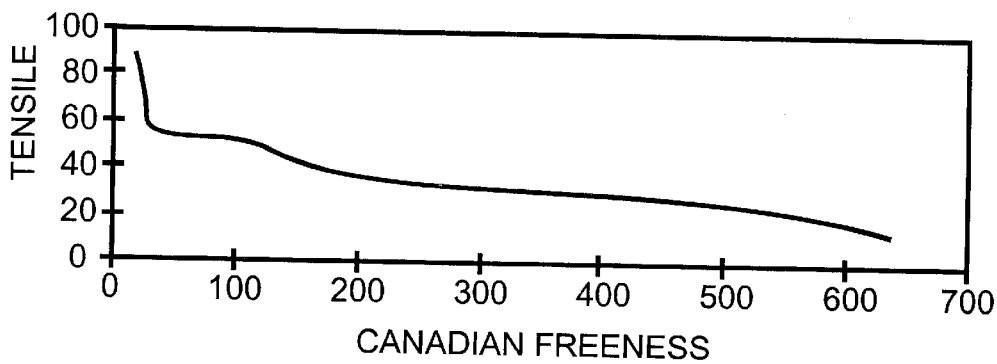

As has been indicated above, a remarkable increase in tensile strength is achieved when separator material according to the invention is produced using pulp that has been beaten or refined to a Canadian freeness not greater than about 120 cc. The increase is illustrated by the data of Examples 17 through 40 concerning tensile strength of separator materials according to the instant invention produced from furnishes containing varying amounts of wood pupl which had been refined to several different Canadian freenesses. The data concerning average tensile strength in g/m² vs. Canadian freeness are presented graphically in FIGS. 18, 19 and 20. FIG. 18 is a plot of the indicated data from Examples 17 through 24; FIG. 19 is a plot of the indicated data from Examples 25 through 32; and FIG. 20 is a plot of the indicated data from Examples 33 through 40.

It has been found that the separator material produced as described in each of the foregoing Examples can be charged to conventional papermaking apparatus, and "repulped", either as the sole source for glass fibers and cellulose fibrils or supplemented with additional glass fibers and cellulose fibrils to produce a furnish which can be deposited on the moving wire of paper making apparatus as described above to produce separator material. As a consequence, there is no need for any of the separator material according to the instant invention to be scrapped; instead, it can be recycled. Further, separator material according to the instant invention has improved puncture strength than otherwise identical separator material which does not contain cellulose fibrils; as a consequence, increased yields of acceptable lead acid batteries having expanded metal or continuous cast grids can be achieved.

As has been explained above, separator material made from first fibers which impart to the sheet an absorbency greater than 90% and second fibers which impart to the sheet an absorbency less than 80% wherein the first and second fibers are present in such proportions that the sheet has an absorbency of from 75 to 95%, when saturated with electrolyte, still has unfilled voids so that gas can transfer from plate to plate for recombination. Such separator material can be produced according to the instant invention by adding to a slurry containing, in suitable proportions, first fibers which impart to the sheet an absorbency greater than 90% and second fibers which impart to the sheet an absorbency less than 80%, from 0.2 percent w/w to 20 percent w/w of a slurry of cellulose fibrils having a Canadian freeness sufficiently low that a separator material produced from the resulting slurry has a tensile strength greater than an otherwise identical separator where glass fibers having an average diameter greater than 1 μm replace the cellulose fibrils. Preferably, the fibers which impart to the sheet an absorbency less than 80% include both relatively coarse glass fibers and hydrophobic organic fibers. Polyethylene, polypropylene, acrylic and polyester fibers are examples of preferred hydrophobic organic fibers.

A preferred separator according to the invention having an absorbency (as defined in the above identified Badger patent, of from 75 to 95% which, when saturated with electrolyte, still has unfilled voids so that gas can transfer from plate to plate for recombination contains 33.6 parts by weight Schuller 206 glass fibers or an equivalent, 50.4 parts by weight Schuller 210X fibers or an equivalent, 11 parts by weight Schuller A20-BC ½ inch glass fibers or equivalent, and 5 parts by weight of polyethylene fibers, and, in addition, from 0.2 percent w/w to 20 percent w/w of cellulose fibrils from a slurry having a Canadian freeness sufficiently low that the separator material has a tensile strength greater than an otherwise identical separator where glass fibers having an average diameter greater than 1 μm replace the cellulose fibrils.

It will be appreciated that various changes and modifications can be made from the specific details of the invention as described above without departing from the spirit and scope thereof as defined in the attached claims.

It has been found that the separator material produced as described in each of the foregoing Examples can be charged to conventional papermaking apparatus, and "repulped", either as the sole source for glass fibers and cellulose fibrils or supplemented with additional glass fibers and cellulose fibrils to produce a furnish which can be deposited on the moving wire of paper making apparatus as described above to produce separator material. As a consequence, there is no need for any of the separator material according to the instant invention to be scrapped; instead, it can be recycled. Further, separator material according to the instant invention has improved puncture strength than otherwise identical separator material which does not contain cellulose fibrils; as a consequence, increased yields of acceptable lead acid batteries having expanded metal or continuous cast grids can be achieved.

As has been explained above, separator material made from first fibers which impart to the sheet an absorbency greater than 90% and second fibers which impart to the sheet an absorbency less than 80% wherein the first and second fibers are present in such proportions that the sheet has an absorbency of from 75 to 95%, when saturated with electrolyte, still has unfilled voids so that gas can transfer from plate to plate for recombination. Such separator material can be produced according to the instant invention by adding to a slurry containing, in suitable proportions, first fibers which impart to the sheet an absorbency greater than 90% and second fibers which impart to the sheet an absorbency less than 80%, from 0.2 percent w/w to 20 percent w/w of a slurry of cellulose fibrils having a Canadian freeness sufficiently low that a separator material produced from the resulting slurry has a tensile strength greater than an otherwise identical separator where glass fibers having an average diameter greater than 1 μm replace the cellulose fibrils. Preferably, the fibers which impart to the sheet an absorbency less than 80% include both relatively coarse glass fibers and hydrophobic organic fibers. Polyethylene, polypropylene, acrylic and polyester fibers are examples of preferred hydrophobic organic fibers.

A preferred separator according to the invention having an absorbency (as defined in the above identified Badger patent, of from 75 to 95% which, when saturated with electrolyte, still has unfilled voids so that gas can transfer from plate to plate for recombination contains 33.6 parts by weight Schuller 206 glass fibers or an equivalent, 50.4 parts by weight Schuller 210X fibers or an equivalent, 11 parts by weight Schuller A20-BC ½ inch glass fibers or equivalent, and 5 parts by weight of polyethylene fibers, and, in addition, from 0.2 percent w/w to 20 percent w/w of cellulose fibrils from a slurry having a Canadian freeness sufficiently low that the separator material has a tensile strength greater than an otherwise identical separator where glass fibers having an average diameter greater than 1 μm replace the cellulose fibrils.

It will be appreciated that various changes and modifications can be made from the specific details of the invention as described above without departing from the spirit and scope thereof as defined in the attached claims.

We claim:

1. A valve regulated lead/sulfuric acid recombinant storage battery comprising a plurality of lead plates in a closed case, a fibrous sheet plate separator between adjacent ones of said plates, and a body of a sulfuric acid electrolyte absorbed by each of said separators and maintained in contact with each of the adjacent ones of said plates, each of said separator sheets comprising a mass of intermeshed glass fibers substantially all of which have a fiber diameter not greater than about 20 μm, and at least 5 percent w/w of which have a fiber diameter less than 1 μm, and, distributed through the glass fibers, from 0.2 percent w/w to 20 percent w/w of beaten cellulose fibrils from a slurry which has a Canadian freeness not greater than 650 cc, said freeness being sufficiently low such that the battery has a service life, when cycled, at least 10 percent greater than a battery made with an otherwise identical separator where glass fibers having an average diameter greater than 1 μm replace the cellulose fibrils.

2. A valve regulated lead/sulfuric acid recombinant storage battery as claimed in claim 1 wherein said cellulose fibrils are impregnated with a solidified, synthetic resin.

3. A valve regulated lead/sulfuric acid recombinant storage battery as claimed in claim 2 wherein said solidified synthetic resin with which the cellulose fibrils are impregnated is a solidified, synthetic latex.

4. A valve regulated lead/sulfuric acid recombinant storage battery as claimed in claim 1 wherein the cellulose fibrils distributed through the glass fibers are from a slurry with a Canadian freeness not greater than 100 cc.

5. A valve regulated lead/sulfuric acid recombinant storage battery as claimed in claim 1 wherein the cellulose fibrils adjacent one of the two opposed major surfaces of the separator material are impregnated with a solidified, synthetic resin, while the cellulose fibrils adjacent the other of the two opposed major surfaces are not so impregnated.

6. A valve regulated lead/sulfuric acid recombinant battery as claimed in claim 5 wherein the cellulose fibrils are impregnated with a solidified, synthetic latex.

7. A valve regulated lead/acid recombinant battery as claimed in claim 1 wherein there are also hydrophobic synthetic fibers in the mass of glass fibers, the synthetic fibers are intermeshed with the glass fibers and with one another, and the size distribution of the glass fibers and the proportions of glass and synthetic fibers are such that the separator has an absorbency for a sulfuric acid electrolyte of from 75 percent v/v to 95 percent v/v.

8. A valve regulated lead/acid recombinant battery as claimed in claim 7 wherein the hydrophobic synthetic fibers which are intermeshed with the glass fibers include polyethylene fibers, polypropylene fibers, acrylic fibers or polyester fibers.

* * * * *